(12) United States Patent
Scanlon et al.

(10) Patent No.: US 8,055,650 B2
(45) Date of Patent: Nov. 8, 2011

(54) SYSTEM AND METHOD FOR ACCESSING DATA IN DISPARATE INFORMATION SOURCES

(75) Inventors: Robert Scanlon, Des Peres, MO (US);
Alex Miller, Webster Groves, MO (US);
Steven Wolfangel, St. Louis, MO (US);
Brad Wright, Manchester, MO (US);
Randall Hauch, Glen Carbon, IL (US)

(73) Assignee: Red Hat, Inc., Raleigh, NC (US)

( * ) Notice: Subject to any disclaimer, the term of this patent is extended or adjusted under 35 U.S.C. 154(b) by 88 days.

(21) Appl. No.: 12/686,042

(22) Filed: Jan. 12, 2010

(65) Prior Publication Data

US 2010/0114952 A1    May 6, 2010

Related U.S. Application Data

(63) Continuation of application No. 10/450,581, filed on Feb. 9, 2004, now Pat. No. 7,668,798.

(60) Provisional application No. 60/194,925, filed on Apr. 4, 2000.

(51) Int. Cl.
*G06F 7/00* (2006.01)
*G06F 17/30* (2006.01)

(52) U.S. Cl. .................. 707/713; 707/760; 707/803

(58) Field of Classification Search .................. None
See application file for complete search history.

(56) References Cited

U.S. PATENT DOCUMENTS

| | | | | |
|---|---|---|---|---|
| 5,634,053 A | * | 5/1997 | Noble et al. .......................... | 1/1 |
| 5,713,014 A | * | 1/1998 | Durflinger et al. .................... | 1/1 |
| 5,734,887 A | * | 3/1998 | Kingberg et al. ...................... | 1/1 |
| 5,790,546 A | * | 8/1998 | Dobbins et al. ............... | 370/400 |
| 5,862,343 A | * | 1/1999 | Landguth et al. .............. | 709/236 |
| 5,897,661 A | * | 4/1999 | Baranovsky et al. ......... | 711/170 |
| 5,966,707 A | * | 10/1999 | Van Huben et al. ................... | 1/1 |
| 6,081,801 A | * | 6/2000 | Cochrane et al. ...................... | 1/1 |
| 6,173,277 B1 | * | 1/2001 | Ashby et al. .......................... | 1/1 |
| 6,298,342 B1 | * | 10/2001 | Graefe et al. .................. | 707/602 |
| 6,339,775 B1 | * | 1/2002 | Zamanian et al. ..................... | 1/1 |
| 6,411,961 B1 | * | 6/2002 | Chen ..................................... | 1/1 |
| 6,457,003 B1 | * | 9/2002 | Gajda et al. ........................... | 1/1 |
| 6,460,043 B1 | * | 10/2002 | Tabbara et al. ........................ | 1/1 |
| 6,473,750 B1 | * | 10/2002 | Petculescu et al. ........... | 707/600 |
| 6,490,590 B1 | * | 12/2002 | Fink .............................. | 707/602 |
| 6,643,652 B2 | * | 11/2003 | Helgeson et al. ..................... | 1/1 |

(Continued)

OTHER PUBLICATIONS

EP Communication and Supplementary European Search Report, 3 pages, Application No. 01926614.7-1527 PCT/US0110943, mailed Mar. 6, 2008.

(Continued)

*Primary Examiner* — Mohammad Ali
*Assistant Examiner* — Patrick Darno
(74) *Attorney, Agent, or Firm* — Lowenstein Sandler PC

(57) ABSTRACT

Embodiments of the invention provide a system for generating and maintaining virtual and physical metadata layers in a MetaBase metadata repository in order to simplify and optimize the retrieval of data from a plurality of disparate information sources. The system stores in a physical metadata layer of a metadata repository a plurality of physical metadata elements, wherein each one of the physical metadata elements corresponds to the metadata elements in the plurality of information sources. Logical metadata elements are stored in the virtual metadata layer and are linked to the physical metadata elements in order to maintain the relationships therebetween. By maintaining the relationships between the physical metadata elements, users can initiate a data query request for data corresponding to a logical metadata element, and the system is configured to retrieve the desired data from the relevant information sources.

17 Claims, 18 Drawing Sheets

U.S. PATENT DOCUMENTS

| | | | |
|---|---|---|---|
| 7,003,504 B1 * | 2/2006 | Angus et al. ............................ | 1/1 |
| 7,213,017 B2 * | 5/2007 | Rys et al. .............................. | 1/1 |
| 2001/0016843 A1 * | 8/2001 | Olson et al. ........................ | 707/3 |
| 2001/0034733 A1 * | 10/2001 | Prompt et al. ................. | 707/102 |
| 2002/0038308 A1 * | 3/2002 | Cappi ........................ | 707/104.1 |
| 2002/0073236 A1 * | 6/2002 | Helgeson et al. ............. | 709/246 |
| 2005/0251500 A1 * | 11/2005 | Vahalia et al. .................... | 707/1 |

OTHER PUBLICATIONS

PCT Search Report, International Application No. PCT/US01/10943 filed Apr. 4, 2001, mailed Jun. 22, 2001.

International Preliminary Examination Report, PCT/US01/10943 filed Apr. 4, 2001, mailed Mar. 18, 2002.

* cited by examiner

801 SELECT { C. CUSTOMER ACCOUNT ID,
         C. CUSTOMER ACCOUNT NAME}

802 FROM { CUSTOMER C.}

803 WHERE {C. CUSTOMER ACCOUNT ID < 100}

| | FORD | | | | CHEVY | |
|---|---|---|---|---|---|---|
| | CARS | | | | TRUCKS | |
| RECORD# | COLOR | MODEL | | RECORD# | COLOR | MODEL |
| 1 | RED | TAURUS | | 1 | BLUE | TRACKER |
| 2 | BLUE | — | | 2 | RED | — |
| 3 | — | — | | 3 | — | — |
| 4 | — | — | | 4 | — | — |
| — | — | — | | — | — | — |
| — | — | — | | — | — | — |
| — | — | | | | | |
| 100 | | | | 50 | | |

FIG. 13

| RECORD# | COLOR | MODEL | MAKE | TYPE |
|---|---|---|---|---|
| 1 | BLUE | TRACKER | CHEVY | TRUCK |
| 2 | RED | TAURUS | FORD | CAR |
| 3 | — | — | — | — |
| 4 | — | — | — | — |
| — | — | — | — | — |
| — | — | — | — | — |
| — | | | | |

140A 141A  142A  143A  144A  145A

| RECORD# | SQ1 | SQ2 | SQ3 | SQ4 |
|---------|-----|-----|-----|-----|
| 1 | A | B | C | D |
| 2 | E | F | G | H |
| 3 | — | — | — | — |
| 4 | — | — | — | — |

| RECORD# | SALES | QUARTER |
|---------|-------|---------|
| 1 | A | 1 |
| 2 | B | 2 |
| 3 | C | 3 |
| 4 | D | 4 |
| 1 | E | 1 |
| 2 | F | 2 |
| 3 | G | 3 |
| 4 | H | 4 |
| — | — | — |
| — | — | — |

FIG. 15

SYSTEM AND METHOD FOR ACCESSING DATA IN DISPARATE INFORMATION SOURCES

RELATED APPLICATIONS

This application is a continuation of Ser. No. 10/450,581 filed Feb. 9, 2004 now U.S. Pat. No. 7,668,798, which claims the benefit of U.S. Provisional Patent Application Ser. No. 60/194,925, filed on Apr. 4, 2000, the entire contents of both of which are hereby incorporated by reference.

TECHNICAL FIELD

This invention relates to database integration, and more particularly, to software components for logically integrating disparate information sources.

BACKGROUND

In recent years, there has been a great deal of improvement in the sophistication and efficiency of methods for storing and retrieving data in information sources. One significant problem with this progression, however, is that different companies (and even different departments within one company) each use different information systems to support their data. It is often a very complex task to integrate data from one information system with data from another information system. Typically, it is necessary for companies to laboriously convert the multiple information source formats to be compatible with each other.

Although there are an infinite number of situations in which it may be desirable to access data stored in disparate information sources, an exemplary situation is the merging of two companies. For instance, prior to the merger, the accounting department of each company may have its own accounting information source, accessible by a corresponding information system. Each accounting information source may store data such as customer names, addresses, social security numbers, interest rates, earnings, or a myriad of other types of data. Each type of data is stored in a data field having a data field name.

Data may be retrieved from the information sources by a user making a query request, using a query request language compatible with the information system and recognizable by the information source.

After the merger of the two companies, a single accounting department is likely to exist. This accounting department will be required to access the data in both of the information sources. However, because the information sources were created and maintained before the merger, they are unlikely to be accessible simultaneously. For instance, if the information systems of each are different, it will be necessary for the accounting department personnel to query the first information source using a first query languages and to query the second information source using a second query language.

However, even in the event that the two information sources employ the same information system (and can therefore be searched using the same query language) the disparity in field names used to store the various types of data in each information source may prevent data from both information sources from being searched simultaneously.

For instance, similar types of data may have been stored in each information source using different data field names (e.g.—customer's names may be stored in a first information source in a data field named "customer", and may be stored in a second information source in a data field named "cust id").

Regardless of the compatibility of query languages used, a query request of customers' names using either field name would fail to retrieve data from the data field having the other field name. Conversely, there may be instances when two fields in different information sources have similar data field names but contain different types of data, thereby resulting in a single query returning two different types of data.

One of the methods that has been employed in the prior art to solve this problem is the employment of data warehouses. FIG. 17 is a block diagram that illustrates the main components of a system that employs data warehousing. In the diagram shown, various information sources are represented by information sources 35a, 35b and 35c.

Each of the information sources are coupled to extraction transformation load 30.

Extraction transformation load extracts data from the disparate information sources on a pre-determined, periodic basis, and transforms it into a common data format.

Extraction transformation load 30 is in turn coupled to data warehouse 25. Once data is extracted from the information sources by extraction transformation load 30 and re-formatted, it is transmitted by extraction transformation load 30 to data warehouse 25 for storage therein. Since extraction transformation load 30 is periodically extracting new data from the information sources, new data is periodically being transmitted by extraction transformation load 30 to data warehouse 25, and the data stored in data warehouse 25 is periodically updated.

Client application 20 is coupled to data warehouse 25, and employs the data stored in data warehouse 25 to perform its intended functions. However, one of the problems that exist with a system of this kind is that the data stored in data warehouse 25, and hence the data employed by the client when performing its intended functions, is stale. This follows because there may be a large volume of data stored in the information sources, requiring a significant amount of time for extraction transformation load 30 to extract the data from the information sources and to transmit it for storage in data warehouse 25. The client's application does not employ data directly from the information sources, but instead employs data which has been updated at some time in the past which is unknown to the client, and which may be inaccurate.

Another method that has been employed in the prior art to solve this problem is the employment of data silos. FIG. 18 is a block diagram that illustrates the main components of a system that employs data silos. In the diagram shown, various information sources are represented by information sources 55a, 55b and 55c. Each of the information sources are coupled to a data accessor 50. In this case, information sources 55a, 55b and 55c are coupled to data accessor 50a, 50b and 50c, respectively.

Data accessors 50 comprise code for retrieving data from the information sources. Data accessors 50a, 50b and 50c are in turn coupled to router middleware module 45. Router middleware module 45 is coded to retrieve and consolidate data from the data accessors. Client application 20 is coupled to router middleware module 25, and communicates with it to request data in order to perform its intended functions.

However, one of the problems that exist with a system of this kind is that a great deal of manual programming labor is required in order to code router middleware 45 and data accessors 50. Specifically, this system requires that router middleware 45 have logic which is hard-coded to the information sources. The problems of generating and maintaining the necessary code to operate a system of this kind can be unmanageable.

Thus, there is a need for a system for logically integrating disparate information sources.

SUMMARY OF THE INVENTION

It is thus a general object of the present invention to provide software components for integrating disparate information sources.

The present invention, in accordance with one embodiment, relates to a system and method for generating and maintaining virtual and physical metadata and metamodels in a MetaBase metadata repository in order to simplify and optimize the retrieval of information from a plurality of disparate information sources. The system stores in the repository a plurality of physical metadata elements, wherein each one of the physical metadata elements corresponds to the metadata elements in the plurality of information sources. As is explained in greater detail below, "metadata" refers to the identifying names of data tables, fields, etc. in an information source (as opposed to "data" which refers to the information stored within the storage spaces defined by the tables, fields, etc.).

In a preferred embodiment, physical metadata elements are stored in the physical metadata layer and correspond directly to the metadata that is obtained from the disparate information sources. Logical metadata elements are stored in a virtual metadata layer and are linked to the physical metadata elements in order to maintain the relationships therebetween.

The present invention, by abstracting the metadata of the disparate information sources, enables the establishment of relationships between the metadata of the disparate information sources. Generally, and as is explained in greater detail in connection with FIG. 3, the system of the present invention generates a model which provides a schema, or structural arrangement, of the metadata in the information sources which make up the model. A model is a first level of abstraction which is employed by the system of the present invention.

The system also generates metamodels, or "data about models". Each metamodel comprises a schema which is abstracted from the schema of the various models which make up the metamodel. At the highest level of abstraction, the system generates a metametamodel, which is still another schema which is abstracted from the schema of the various metamodels employed by the system. This highest level schema, which has been successively abstracted from the metadata of the disparate information sources, provides a framework which replaces the incompatible schemas of the different information sources in order to provide uniform accessibility to the data of all the information sources.

The present invention, according to one embodiment, enables a user to execute a query request against a metamodel in order to retrieve data from the native information sources. By successive abstractions of the data and metadata of various information sources, the varying structures and organization of data in the information source (also referred to as a "schema"), is replaced with a schema which describes the structure and organization of all of the information.

Furthermore, by maintaining the relationships between the physical metadata elements, users can initiate a data query request for data corresponding to a logical metadata element, and the system is configured to retrieve the desired data from the relevant information sources, even though the relevant information sources maintain the data in fields having different data field names, even though the information sources employ incompatible data formats, and even though the information in each source may be organized substantially different that it is organized in each physical source. In addition, and as described in further detail below, the system of the present invention is configured to retrieve the desired data from the relevant information sources, even though the relevant information sources employ different query languages.

Thus, by logically integrating the data from disparate information sources, the present invention provides a system and method which enables a user to access any information source regardless of the information system which is employed by the individual information sources, and regardless of the format that the individual information source employs to store its data. Furthermore, the present invention enables a client's application programming interface to communicate with a defined set of metadata elements, even if the client changes the information sources from which information is desired to be obtained.

The above description sets forth rather broadly the more important features of the present invention in order that the detailed description thereof that follows may be understood, and in order that the present contributions to the art may be better appreciated. Other objects and features of the present invention will become apparent from the following detailed description considered in conjunction with the accompanying drawings. It is to be understood, however, that the drawings are designed solely for the purposes of illustration and not as a definition of the limits of the invention, for which reference should be made to the appended claims.

BRIEF DESCRIPTION OF THE DRAWINGS

In the drawings in which like reference characters denote similar elements throughout the several views:

FIG. 8 illustrates a sample SQL-like query, as is known in the prior art.

FIG. 12 illustrates a pair of data tables which store automobile information in a multi-columned format, as is well known in the prior art;

FIG. 13 illustrates a data table in which the automobile information of the pair of data tables in FIG. 12 is joined into a single data table in accordance with a joining operation, according to one embodiment of the present invention;

FIG. 14 illustrates a data table which stores quarterly sales data in a multicolumned format, as is well known in the prior art;

FIG. 15 illustrates a data table in which the quarterly sales data of FIG. 14 is re-formatted into a single-columned format in accordance with a dimensional transform, according to one embodiment of the present invention;

DETAILED DESCRIPTION

The present invention, according to one embodiment thereof, relates to a system which employs metadata to integrate data from disparate information sources. As previously mentioned, metadata may refer to the names of the storage spaces in an information source, such as the various data field names or data table names in an information source. Thus, for instance, an information source may store data relating to a customer's name, address, social security number, etc. This data is arranged in data fields which are identifiable to a user of the information source by the names of the various data fields. These data field names, which identify the type of data which is stored in the data fields of an information source, are referred to as metadata.

Figure 1:
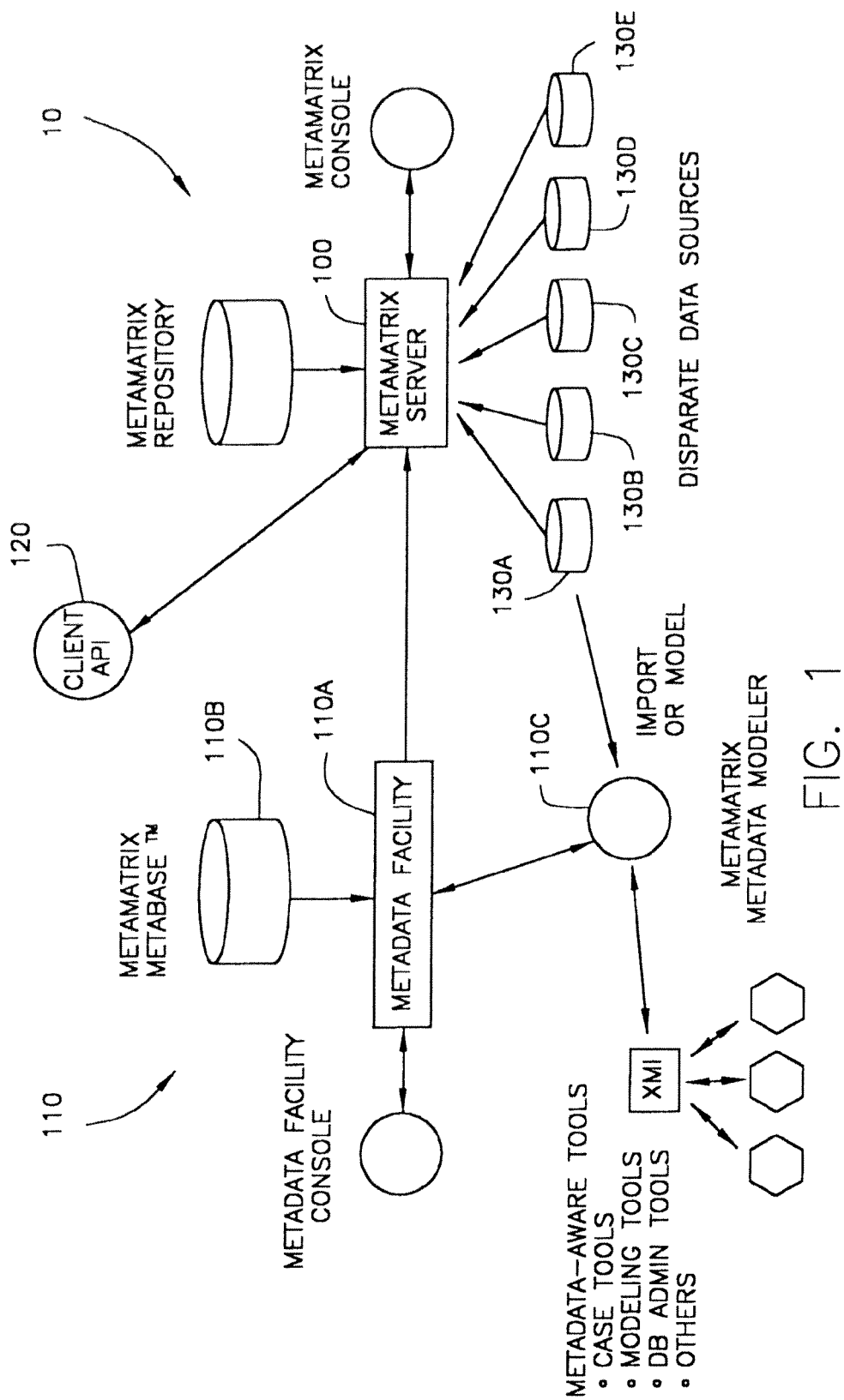
FIG. 1 is a block diagram that illustrates some of the main components of the metadata management system, in accordance with one embodiment of the present invention.

FIG. 1 is a block diagram that illustrates some of the main components of the system of the present invention, in accordance with one embodiment thereof. System 10 comprises client application programming interface 120, which is coupled to, and configured to communicate with, MetaMatrix server 100. Client application programming interface 120 refers to a set of methods that are exposed to clients of a particular piece of software. MetaMatrix server 100 refers to the component which obtains and processes the metadata and communicates a set of results to the user via client application programming interface 120.

MetaMatrix server 100 is also coupled to various information sources. In FIG. 1, these information sources are represented by information sources 130a through 130e.

However, it is recognized that MetaMatrix server 100 may be coupled to any number of information sources, and that the information sources may store any conceivable type of data. MetaMatrix server 100 and information sources 130 are configured to communicate data (as will be shown and explained in FIG. 3, this data may comprises various formats, such as data from a data storage file or Internet feed, etc.), as well as metadata (such as the data field or data table names in which the stock prices, inventories, etc. are stored) as requested by MetaMatrix server 100.

MetaMatrix server 100 is also coupled to metadata repository 110. Metadata repository 10, according to one embodiment of the invention, comprises metadata facility 110a, which is coupled to MetaMatrix server 100 in order to communicate metadata thereto.

Metadata repository 110 also comprises MetaBase metadata repository 110b, which stores the various metamodels. Specifically, a user may select a run-time metamodel from those stored in MetaBase metadata repository 110b, which is then employed to access the information stored in the various information sources which correspond to that metamodel.

System 10 also comprises, as discussed previously, metadata modeler 110c.

Metadata modeler 1110c imports metadata from the disparate information sources and generates metamodels. Although the metamodels may be generated automatically, they may also be generated by a client using interface tools. In this case, the system provides an interface to a client via which the client may create a customized metamodel or may manipulate an existing metamodel.

Figure 2:
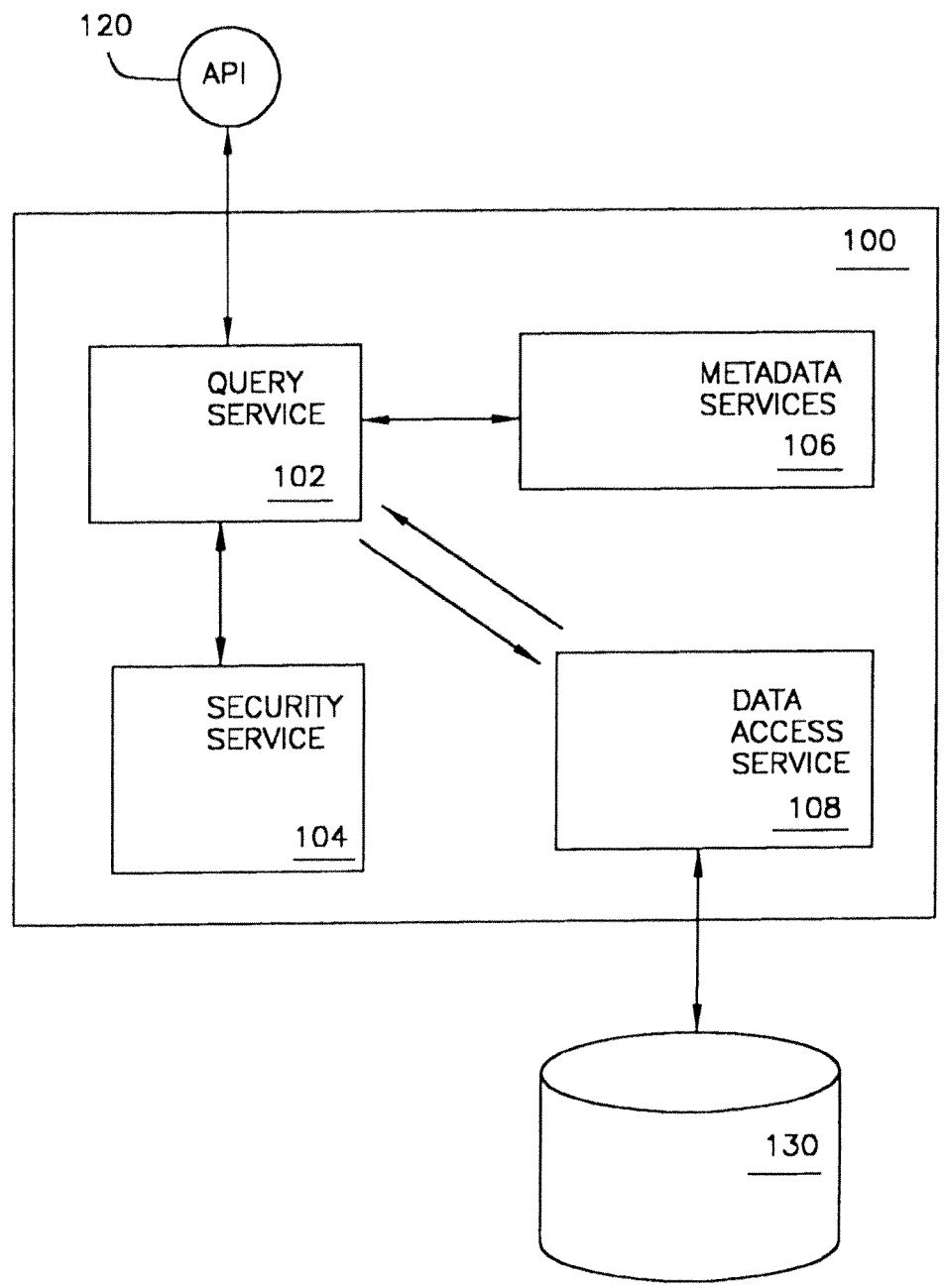
FIG. 2 is a block diagram that illustrates some of the processing modules of the MetaMatrix server 100, in accordance with one embodiment of the present invention.

FIG. 2 is another block diagram that illustrates some of the logical processing modules of MetaMatrix server 100. Specifically, MetaMatrix server 100 comprises query service module 102. Query service module 102 is coupled to and communicates with client application programming interface 120 for receiving the query requests generated by the client, and for transmitting a response to the query request once the query request has been processed by MetaMatrix server 100. These steps are discussed in greater detail below in connection with the flowchart of FIG. 7. In addition, MetaMatrix server 100 comprises security service module 104. Security service module 104 is coupled to and communicates with query service module 102 in order to determine whether the person or system that is making the query has the required authorization to do so.

MetaMatrix server 100 also comprises metadata services module 106. Metadata services module 106 is coupled to and communicates with query service module 102 in order to define metamodels, as discussed in greater detail below. In addition, MetaMatrix server 100 comprises data access service module 108. Data access service module 108 is coupled to and communicates with query service module 102. Furthermore, data access service module 108 is coupled to and communicates with information sources 130. It is noted that the modules are shown separately for the purpose of illustrating the logical operation of each module. However, it is further noted that the present invention may employ any number of components in order to perform the logical functions described in connection with each logical module shown herein.

Generally, query service module 108 requests data from data access service module 108 using a query plan which has been generated using metadata services module 106. Once data access service module 108 has retrieved the desired data from information sources 130, data access service module 108 transmits the data to query service module 102 for delivery to a user employing the client application programming interface 120. As previously mentioned, MetaMatrix server 100 is coupled to and communicates with metadata repository 110, which stores the metadata and metamodels.

Figure 3:
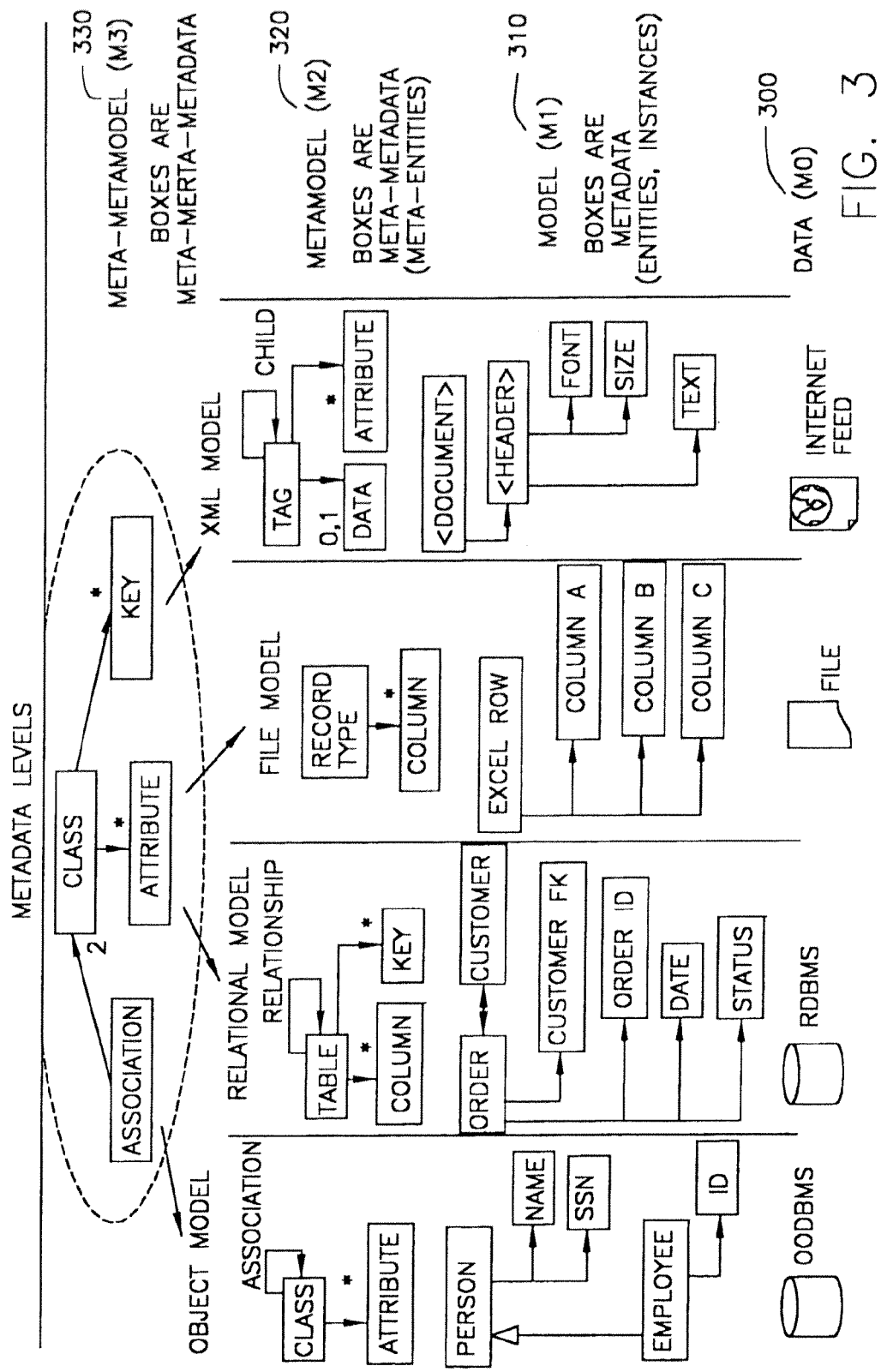
FIG. 3 shows how data is abstracted by the system of the present invention in order to generate models, metamodels and meta-metamodels, in accordance with one embodiment of the present invention.

FIG. 3 is a diagram that illustrates the different levels of abstraction which are employed by the system of the present invention, in order to logically integrate different types of information. A first level, identified as level 300, comprises data. This data may comprise various formats received from various types of information sources. For instance, FIG. 3 shows that, for an XML model, the data may be received from an Internet feed, while for a file model, the data may be received from a data file. Similarly, for a relational model, the data may be received from a relational database management system, while for an object model, the data may be received from an object-oriented database management system.

At a higher level of abstraction, identified as level 310, a model is illustrated.

Each model comprises the arrangement of the metadata elements which are employed to describe the format of the data. For instance, in the XML model, model 310 illustrates that the data has a format which comprises a document name, a document header, and text stored in a particular font and size. Each box of level 310 corresponds to metadata, while the arrangement of the metadata corresponds to a model. As shown, a model exists for each of the different data types. However, each model differs substantially from other models, thus rendering the models incompatible.

At a next higher level of abstraction, identified as level 320, a metamodel is illustrated. Each metamodel comprises the arrangement of the models which are shown in level 310. For instance, in the XML model, metamodel 320 illustrates that the metadata has a format which comprises a "tag" (e.g.—the identification of the metadata, such as the document name and the header name), "data" (e.g.—the text of the data) and "attributes" (e.g.—the font and size in which the text is written). Each box of level 320 corresponds to meta-metadata, while the arrangement of the model corresponds to a meta-model. As shown, a metamodel exists for each of the different data types.

At the highest level of abstraction, identified as level 330, a meta-metamodel is illustrated. The meta-metamodel comprises several elements in a format which can be employed to access any of the different data models. Thus, even though the data and metadata formats shown in level 310 are incompatible relative to each other, they may be accessed by the system of the present invention, which has abstracted them to a point at which they are compatible. In other words, by abstracting the data and metadata in successive levels, a framework has been generated which replaces the different schemas of the different information sources with a single schema which provides uniform accessibility to all of the information sources.

Figure 4A:
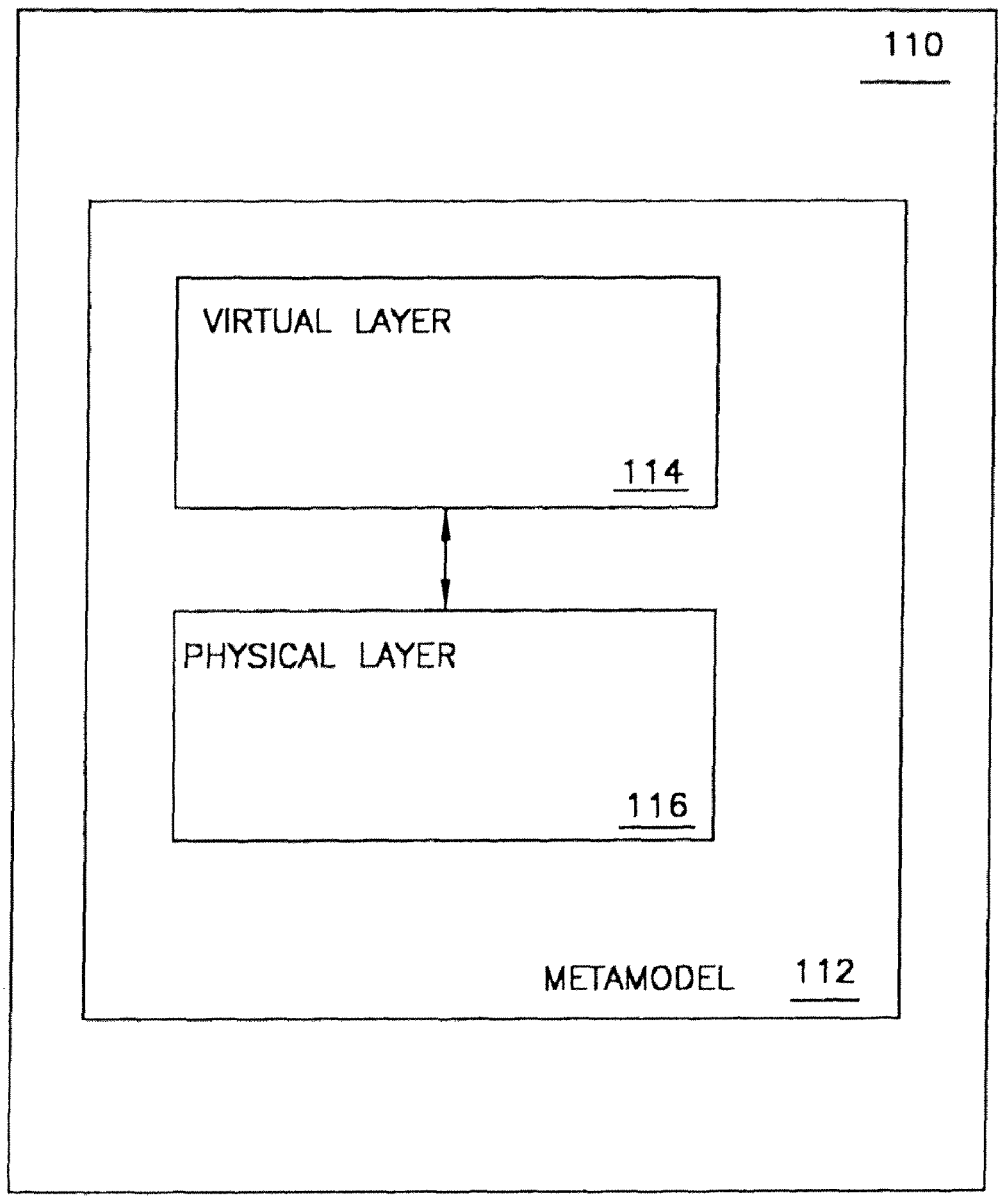
FIG. 4(a) shows a metamodel comprising virtual and physical metadata layers, in accordance with one embodiment of the present invention.
Figure 4B:
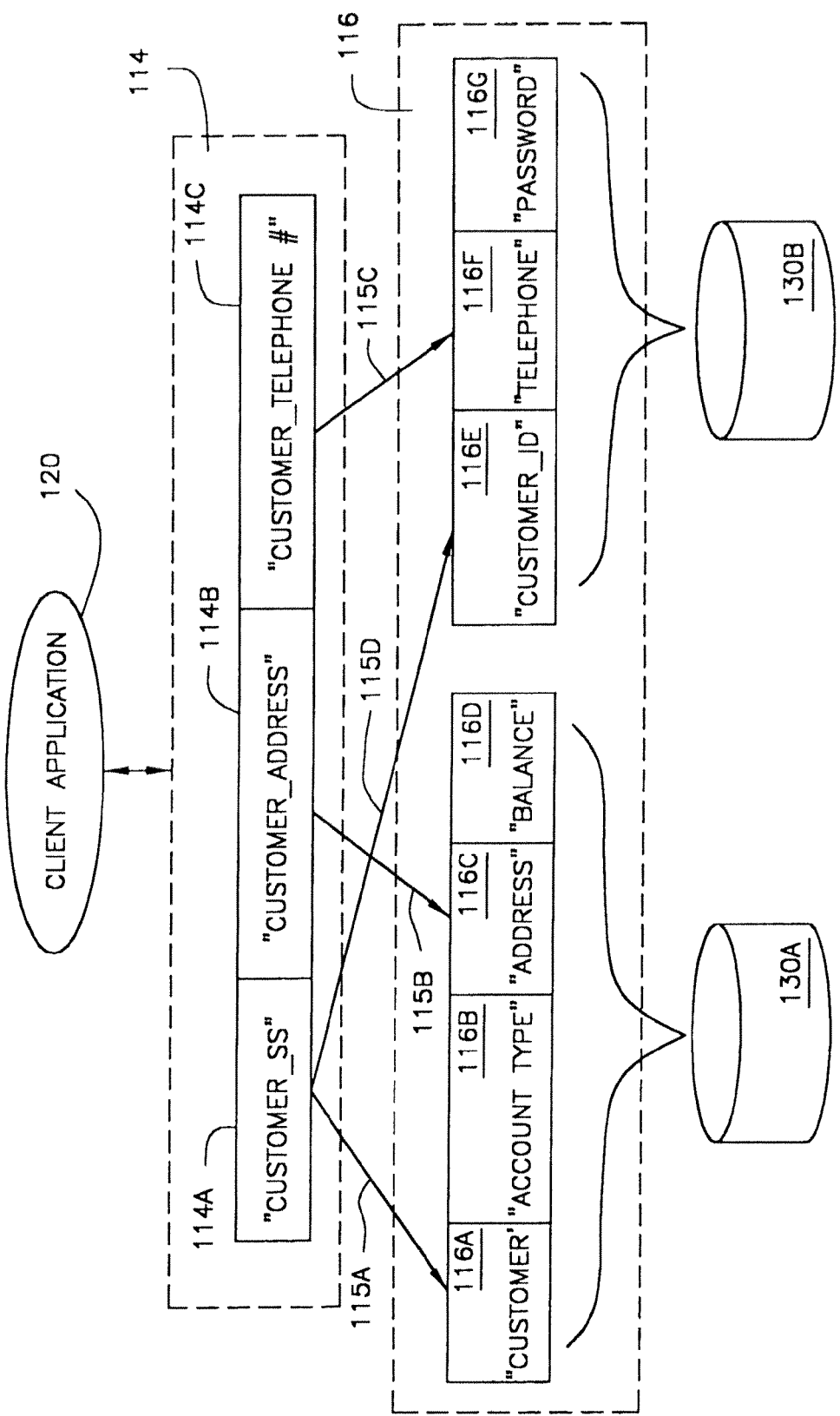
FIG. 4(b) is a block diagram that illustrates an example of a virtual metadata layer linked with a physical metadata layer, in accordance with one embodiment of the present invention.

FIG. 4(*a*) is a block diagram that shows an example of a metamodel 112.

Generally, metamodel 112 is a model of various metadata elements and the relationships therebetween. As shown in the diagram, metamodel 112 may comprise a pair of metadata layers. A first layer is referred to as a physical metadata layer 116. A second layer is referred to as a virtual metadata layer 114.

Physical metadata layer 116 comprises the actual metadata elements (e.g.—the data field names, data table names, etc.) that are employed in the information sources. If the information sources that are employed by the system are changed, the metadata elements in physical metadata layer 116 are also changed, since the metadata elements in physical metadata layer 116 correspond directly to the metadata elements in the new information sources. As will be explained in greater detail below, MetaMatrix server 100 is configured to discern, from each new information source which is connected thereto, a description of the new information source's metadata, so that MetaMatrix server 100 can integrate it with the same metadata information from the other connected information sources.

The metadata elements that are stored in physical metadata layer 116 are linked to logical metadata elements that are stored in virtual metadata layer 114. Logical metadata elements are a second set of metadata elements which have been generated in order to represent the metadata elements of the disparate information sources to the client's application programming interface 120 as is explained below. The linking between each logical metadata element stored in virtual metadata layer 114 and its corresponding physical metadata element stored in physical metadata layer 116 is performed, according to one embodiment of the invention, by a programmer that manually links the elements during the process of configuring the metadata management system. However, the present invention also contemplates that the linking may be performed automatically or electronically. Again, it is noted that, while these layers are shown as existing separate and distinct from each other, this is merely to illustrate that the layers are separate in the logical sense described herein.

FIG. 4(*b*) is a block diagram that illustrates virtual metadata layer 114 and physical metadata layer 116 in more detail. Specifically, the diagram illustrates one example of layers 114 and 116 in which virtual metadata layer 114 comprises three logical metadata elements. Of course, virtual metadata layer 114 may comprise any number of logical metadata elements. In the example shown, logical metadata element 114*a* has a metadata field name "custid", logical metadata element 114*b* has a metadata field name "custaddress" and logical metadata element 114*c* has a metadata field name "custtelno". Each of these metadata elements may also comprise explanatory text, inserted by a manual programmer, which provides a more detailed description of the type of data which the logical metadata element refers to. This explanatory text enables a manual programmer to subsequently employ the metadata element with the assurance that the type of data which it refers to is not linked to physical metadata elements in physical metadata layer 116 that stores a different type of data.

In the example illustrated by the diagram, physical metadata layer 116 comprises two sets of physical metadata elements. Each set of physical metadata elements corresponds to an information source, such that physical metadata elements 116*a* through 116*d* directly correspond to the data field names stored in information source 130*a*, while physical metadata elements 116*e* through 116*g* directly correspond to the data field names stored in information source 130*b*. Of course, physical metadata layer 116 may comprise any number of physical metadata elements which correspond to any number of information sources. In the first set of elements, physical metadata element 116*a* has a metadata field name "customer", physical metadata element 116*b* has a metadata field name "accounttype", physical metadata element 116*c* has a metadata field name "address", and physical metadata element 116*d* has a metadata field name "balance." In the second set of elements, physical metadata element 116*e* has a metadata field name "custid", physical metadata element 116*f* has a metadata field name "telephone" and physical metadata element 116*g* has a metadata field name "password."

Each of the logical metadata elements in virtual metadata layer 114 corresponds to one or more physical metadata elements in physical metadata layer 116. According to one embodiment, a programmer establishes the correspondence between the elements by linking each of the logical metadata elements in virtual metadata layer 114 to one or more physical metadata elements in physical metadata layer 116. These links are illustrated in FIG. 4(*b*) as links 115*a* through 115*d*.

For instance, in the example shown, logical metadata element 114*a* is linked to physical metadata elements 116*a* and 116*e*. Thus, when a user of client application programming interface 120 initiates a query request for the social security number of a customer (the manner in which the system of the present invention processes a query request is described below), it may be performed by making a single query request, using the logical metadata field name "custss". Because the virtual metadata element 114*a* is linked to physical metadata elements 116*a* and 116*e*, the system will convert the client's request for a single query into a query request of the physical metadata elements "customer" and "custid" of information sources 130*a* and 130*b*, respectively. Thus, the present invention, in accordance with one embodiment, enables a user to employ a single known metadata element regardless of which (and how many) information sources that type of data is stored in, and regardless of the metadata element names in which the information sources store the data.

In addition to metadata information relating to the disparate information sources, the physical metadata layer 116 in Metamodel 112 is configured, according to one embodiment of the invention, to store information relating to the attributes of the data tables stored therein. The metamodeler may also discern and store in the physical metadata layer 116 data corresponding to the attributes of various metadata elements which have been retrieved from the disparate information sources, as well as key information (e.g.—in the event that an information source employs representational symbols or characters, the key information provides a translation of what the representational symbols or characters represent).

Similarly, the virtual metadata layer 114 of Metamodel 112 advantageously permits the metadata of disparate information sources to be manipulated in various ways.

For instance, according to one embodiment, the employment of the virtual metadata layer permits metadata elements from disparate information sources to be re-named. The employment of the virtual metadata layer also permits metadata elements from disparate information sources to also be grouped in ways which are advantageous to a user, as will be explained below.

Most significantly, the virtual metadata layer may be employed to create new relationships between data in disparate information sources. Thus, the semantic equivalence of differently named data elements in different information sources is exposed to viewers of the metadata. Once exposed, a viewer may implicitly join the different data tables in the disparate information sources and perform a variety of operation thereon, such as sorting or joining the data from the information sources.

As previously mentioned, each of the logical metadata elements in virtual metadata layer 114 may comprise explanatory text which provides a more detailed description of the type of data which the logical metadata element refers to. In addition, each logical metadata element may also be linked to other logical metadata elements in virtual metadata layer 114 which define operations to transform the information that is received from the physical metadata elements. According to one embodiment, a logical metadata element which transforms the data it receives is referred to as a transformation logical metadata element, while the logical metadata element that stores the rule which governs how the information is to be transformed is referred to as a logical rule element.

Figure 5A:
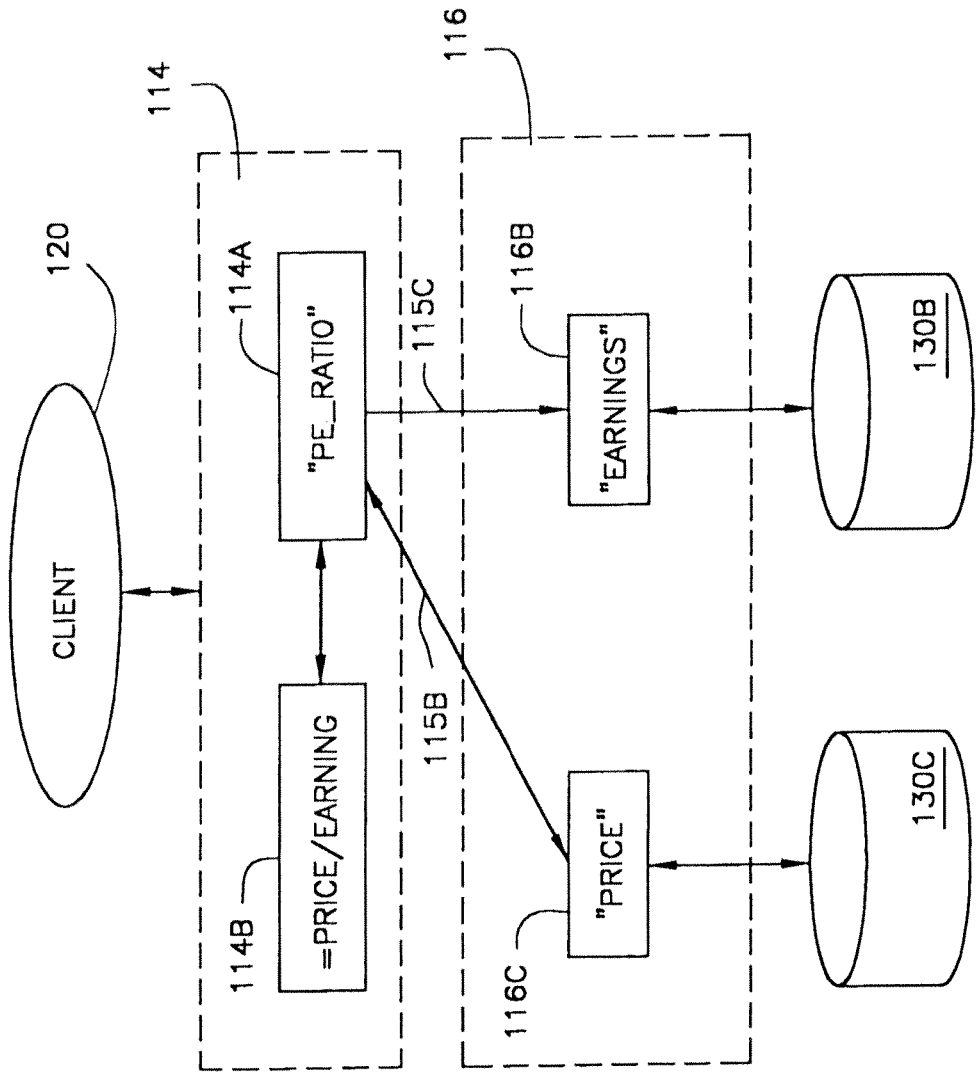
FIG. 5(a) is a block diagram that illustrates the virtual metadata layer and the physical metadata layer, in accordance with one embodiment of the present invention.
Figure 5B:
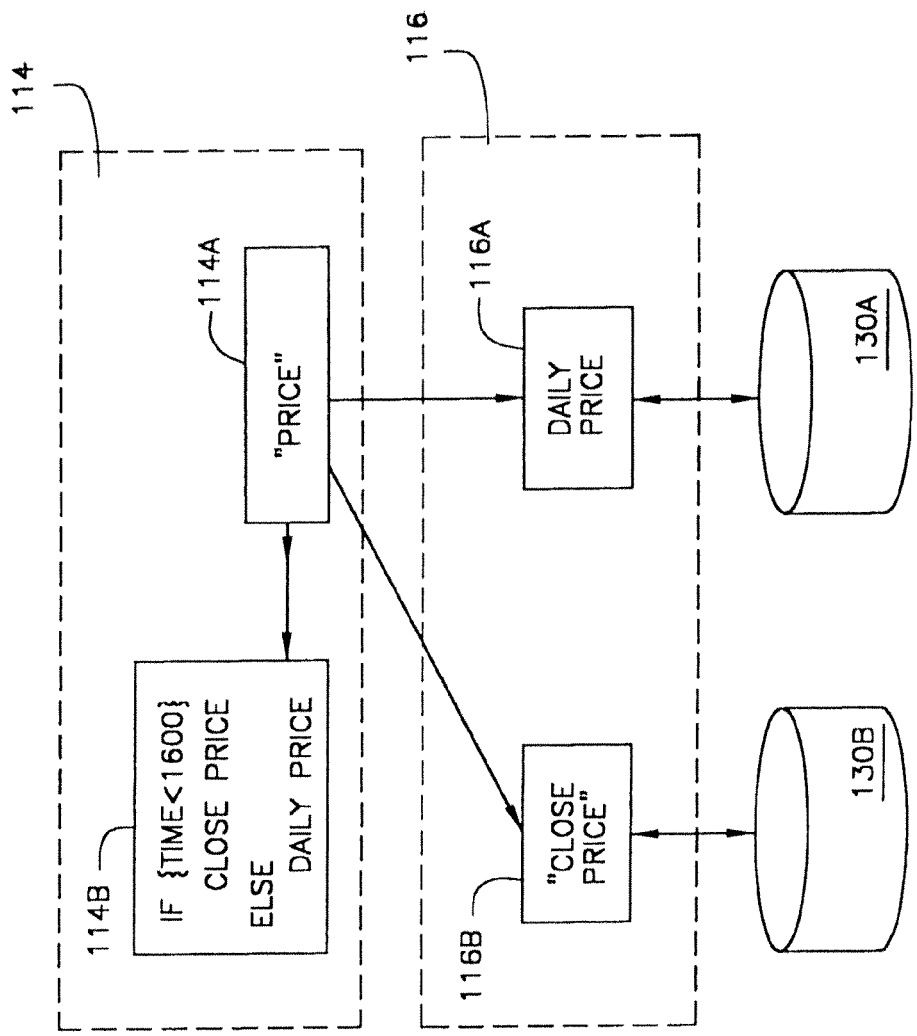
FIG. 5(b) is a block diagram that illustrates the virtual metadata layer and the physical metadata layer, in accordance with another embodiment of the present invention.

An example of this is shown in FIG. 5(*a*). FIG. 5(*a*) is a block diagram that illustrates virtual metadata layer 114 and physical metadata layer 116, in which a logical metadata element is configured to transform the information that it receives from physical metadata element 116. In the embodiment shown, logical metadata element 114*a* is named "PE.about. RATIO", and refers to a commonly employed financial measurement called "price-to-earnings ratio" (which is equal to a ratio of a company's stock price divided by the company's earnings). In the embodiment shown, logical metadata element 114*a* is linked to physical metadata elements 116*b* and 116*c*. Physical metadata element 116*b* refers to a data field called "earnings", corresponding to an identical data field name in information source 130*b*, while physical metadata element 116*c* refers to a data field called "price", corresponding to an identical data field name in information source 130*c*.

As shown, logical metadata element 114*a* is also linked to logical rule element 114*b*. Logical rule element 114*b* comprises a pre-defined operation, or rule, by which the information in physical metadata elements 116*a* and 116*b* are to be transformed when received by logical metadata element 114*a*. Therefore, logical metadata element 114 comprises a transformation logical metadata element, while logical metadata element 114*b* comprises a logical rule element.

In this instance, logical metadata element 114*b* provides that the rule-based transformation to be performed by logical metadata element is to divide the price data received from physical metadata element 116*c* by the earnings data received from physical metadata element 116*b*. Once the logic is employed to transform the data, the price-to-earnings information may be transmitted to the client. Of course, the present invention contemplates that any type of predefined operation may be employed, including but not limited to multiplication, division, addition, subtraction, etc.

One of the principal advantages of the virtual metadata layer is that the linking between its various elements can be modified without changing the metadata elements which are employed by the user. For instance, in the previous example, if the system was re-configured to be connected to a different information source which already calculated the "price-to-earnings ratio", logical metadata element 114*a* would be linked to the P/E data directly, and would not need to be linked to physical metadata elements 116*b* or 116*c*, or to logical metadata element 114*b*. Despite the alterations that are made to these linkings, a user would still query the system using the same search field "PERATIO" as before, inserting a predictable communication via the client's application programming interface 120.

In addition to employing transformation and rule elements, the present invention, according to one embodiment thereof, may also employ select logical data elements.

According to this embodiment, a first logical metadata element may be linked to several physical metadata elements. In addition, the first logical metadata element may be linked to a second logical metadata element which provides a pre-defined selection criteria for determining which of the several physical metadata elements are to be employed by the first logical metadata element. In such a case, the first logical metadata element is referred to as a select logical metadata element, while the second logical metadata element is again referred to as a logical rule element.

An example of this is shown in FIG. 5(*b*). FIG. 5(*b*) is a block diagram that illustrates virtual metadata layer 114 and physical metadata layer 116. This figure provides an example of a situation in which a logical metadata element must select which of several physical metadata elements that are linked to it should be employed to provide data thereto. In the embodiment shown, logical metadata element 114*a* is named "PRICE" (e.g.—a company's stock price). Logical metadata element 114a is linked to physical metadata elements 116a and 116b. Physical metadata element 116a refers to a data field called "DAILY PRICE" (e.g.—the price of a stock at any time during normal business hours), corresponding to an identical data field name in information source 130a, while physical metadata element 116b refers to a data field called "CLOSING PRICE" (e.g.—the last price of the stock upon the close of the business day), corresponding to an identical data field name in information source 130b.

As shown, logical metadata element 114a is also linked to logical metadata element 114b. Logical metadata element 114b comprises a selection criteria, or rule, which determines whether the information in physical metadata elements 116a will be employed by logical metadata element 114a, or whether the information in physical metadata elements 116b will be employed by logical metadata element 114a instead. In this instance, logical metadata element 114b provides a selection criteria in which logical metadata element 114a will employ the information in physical metadata element 116a (e.g.—the "DAILY PRICE") if the time of day is earlier than 4:00 p.m., and will employ the information in physical metadata element 116a (e.g.—the "CLOSE PRICE") if the time of day is later than 4:00 p.m. Once the logic is employed to select the appropriate information source, the "PRICE" information may be transmitted to the client. Of course, the present invention contemplates that any type of selection criteria may be employed.

Again, it is emphasized that the employment by the present invention of the virtual and logical metadata layers insures a predictable communication with a user via client application programming interface 120. Thus, even if the system was reconfigured to retrieve the price data from different information sources, or to use a different selection criteria for determining which price data to employ, the present invention provides that a user may still employ the "PRICE" element in a query request.

Figure 6:
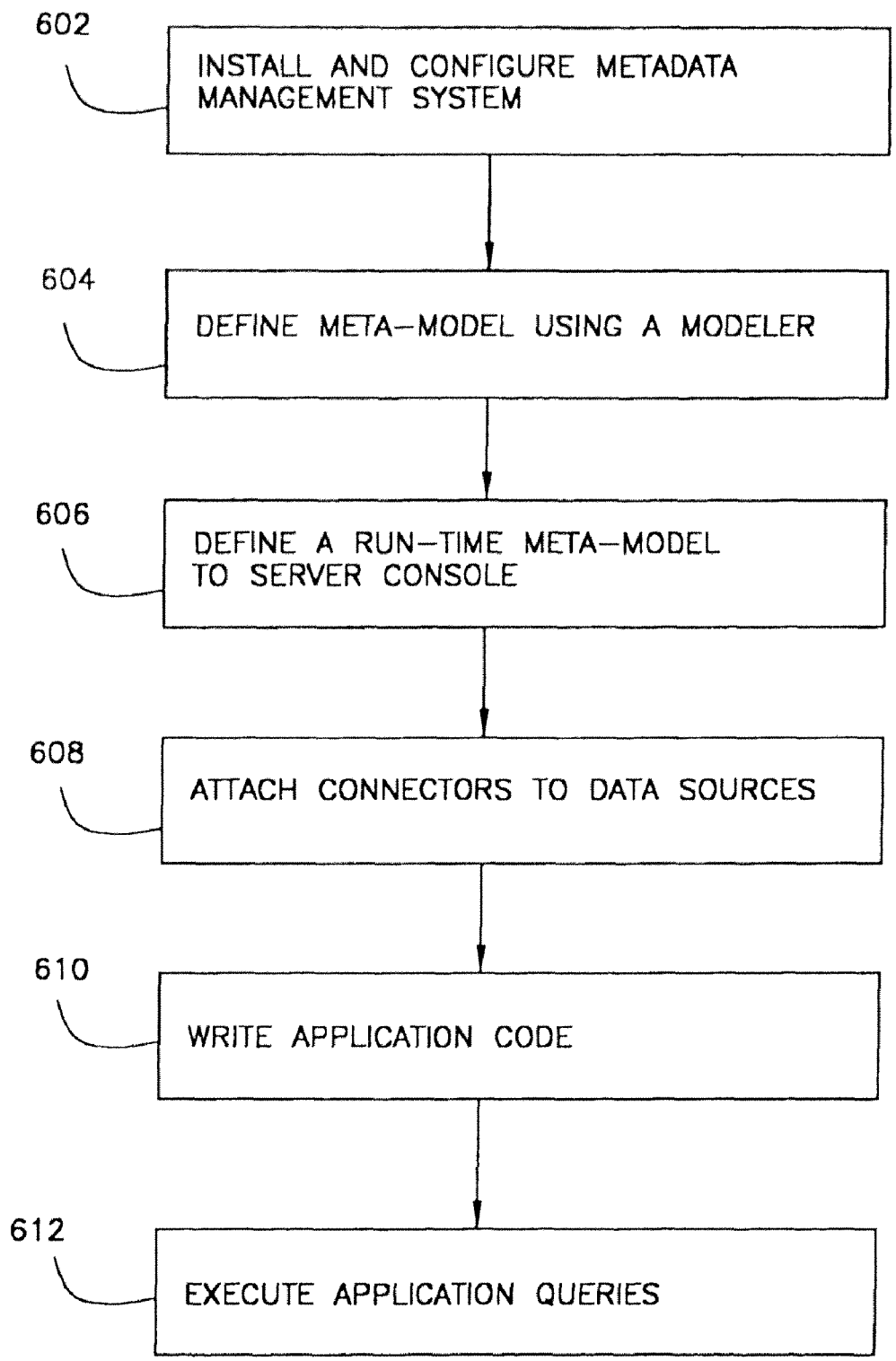
FIG. 6 is a flowchart that illustrates the steps that are performed in order to deploy the above-described metadata management system, in accordance with one embodiment of the present invention.

As mentioned previously, prior to using the metadata management system of the present invention to execute query requests, the system must be configured so that data and metadata stored in the information sources can be employed by the system. FIG. 6 is a flowchart that illustrates the steps that are performed, in accordance with one embodiment thereof, in order to deploy the above-described metadata management system. At step 602 of the flowchart, metadata management system 100 is installed and configured by a user. In one embodiment, this includes installing a server which houses the metadata management system. In doing so, the user specifies basic server properties, such as determining administrative definitions and selecting a machine port which the server is connected to. This may also include specifying storage locations and defining internal information sources. Step 602 may also include the use of client tools in order to configure the system.

At step 604, metamodels are defined by using a modeller. As previously mentioned, while models provide a structural framework or arrangement of the metadata of an information source, a metamodel is a model of these first level metadata models.

As such, they are a higher level abstraction of the metadata, providing a uniform structure to otherwise incompatible data formats. Advantageously, more than one metamodel is defined.

At step 606, a metamodel is defined to the server console. Specifically, a user selects a run-time metamodel against which query requests shall be executed. This run time metamodel comprises one of the metamodels which were defined in step 604. At step 608, connectors are attached to the information sources. Advantageously, steps 602 through 608 are performed by a technician trained to operate the metadata management system.

At step 610, the application code is written. At step 612, the query requests entered by a user are executed. The execution of the query requests is explained in greater detail in connection with the flowchart illustrated in FIG. 7. Generally, the system executes the query requests by converting the client's original query request into a source-specific data query request, accessing the disparate information sources using the source-specific data query request, and delivering the data results to the user.

Figure 7:
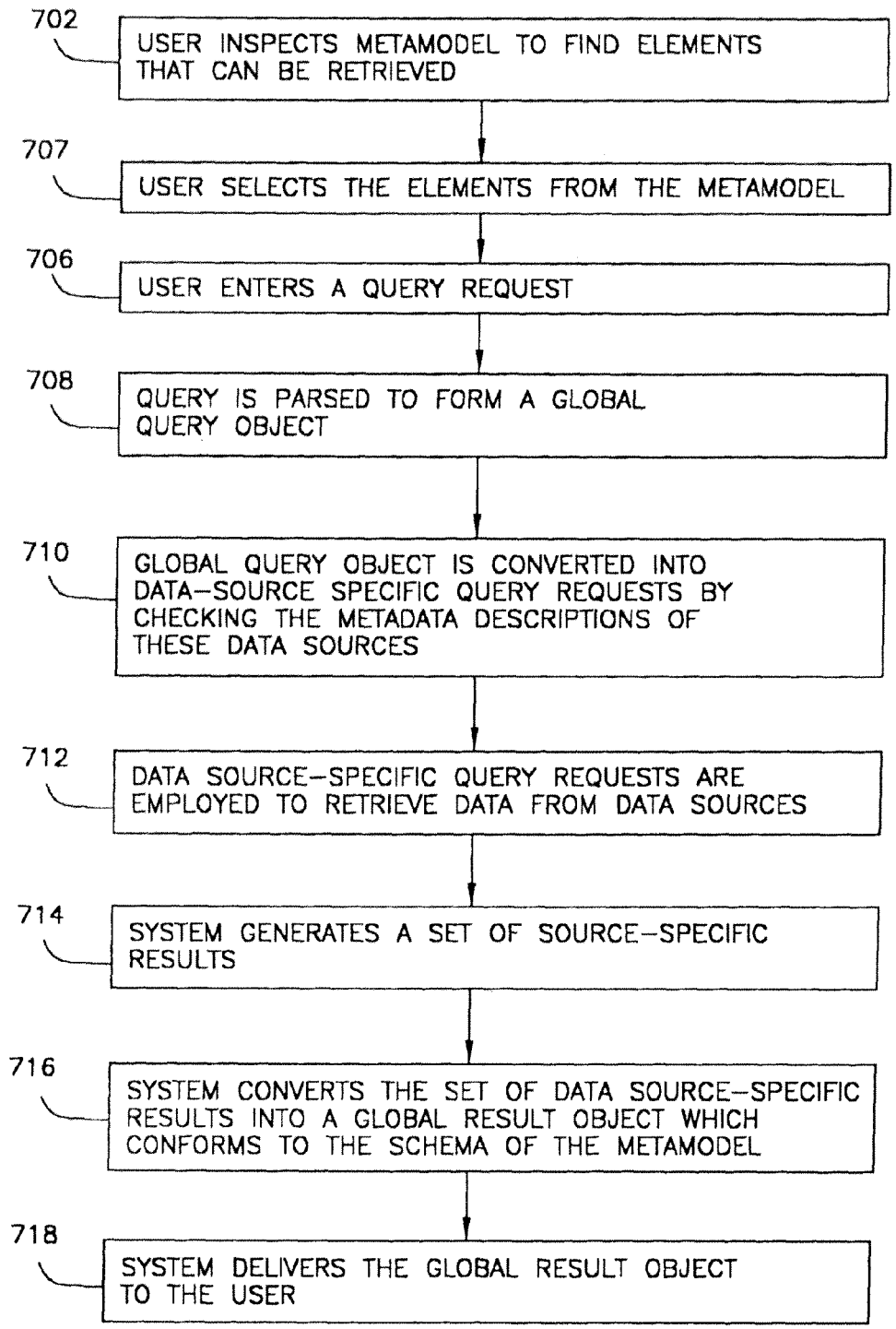
FIG. 7 is a flowchart that illustrates the steps that are employed by the metadata management system in order to execute a query request entered by a user, in accordance with one embodiment of the present invention.
Figure 9:
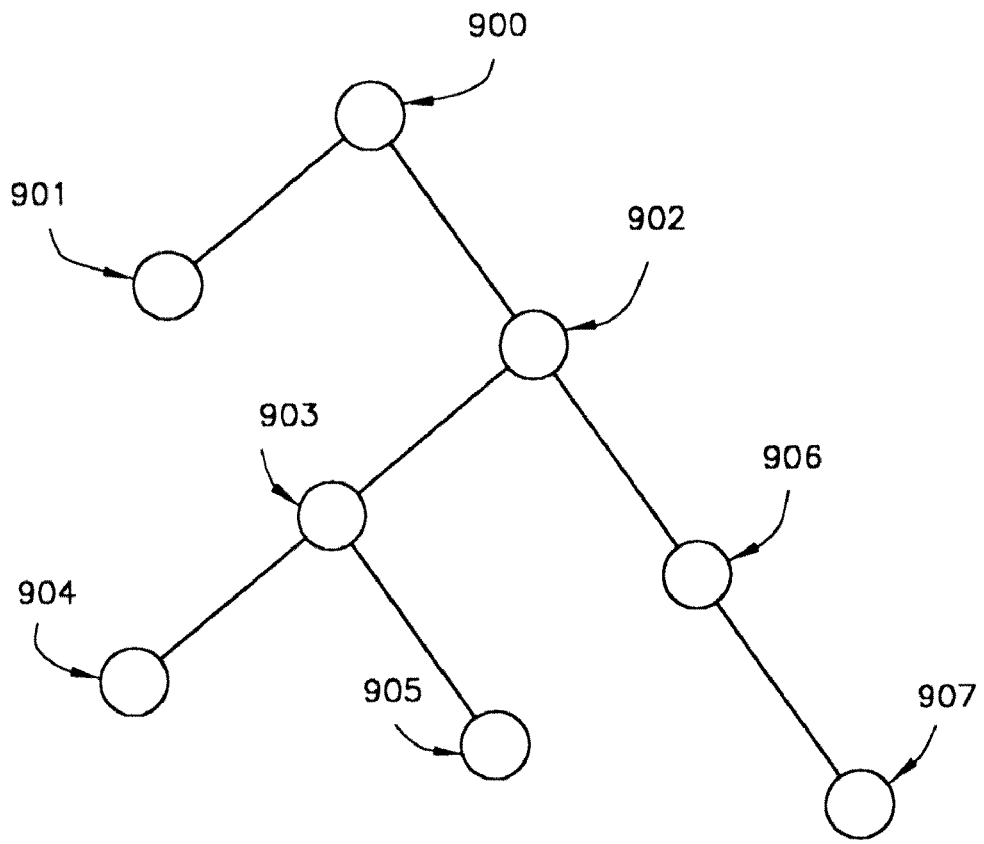
FIG. 9 is a diagram that illustrates a query request plan as a configuration of nodes, in accordance with one embodiment of the present invention.

As stated above, FIG. 7 is a flowchart that illustrates the general steps that are employed by the metadata management system of the present invention in order to execute a query request entered by a user. Generally, these steps involve the generation and execution of a query plan, which is a method by which a query is to be executed. An example of a query plan is shown in FIG. 9, which explains the query plan in greater detail.

Referring now to FIG. 7, at step 702, a user inspects a selected metamodel to find elements that can be retrieved. At step 704, the user selects the elements from the metamodel. At step 706, a user enters a query request for the selected element. Although there are numerous query languages or formats which may be employed for this purpose, a query request format which is commonly employed is referred to as SQL. An example of a SQL-like query request is illustrated in FIG. 8. Specifically, a SQL-like query comprises a "select" field listing the name of the element desired to be queried (as shown in line 801). According to the present invention, the "select" field of the SQL-like query request lists the name of a logical metadata element stored in virtual metadata layer 114.

The SQL-like query request also comprises a "from" field listing the information source in which the selected element is stored (as shown in line 802), and a "where" field listing the conditions or restrictions that the user desires to impose upon the query (as shown in line 803). As described herein, the present invention, by abstracting the metadata of an information source into models, metamodels, etc. enables the employment by user of a single query request language or format, vastly simplifying the retrieval of information from disparate information sources.

Returning to the flowchart of FIG. 7, at step 708, the query request entered by the user is parsed. According to one embodiment of the invention, the query request is parsed by processing the user's original query so as to generate a global query object.

This parsing step may be performed by a parser module located in MetaMatrix server 100.

At step 710, the global query object that was generated in step 708 is converted into information source-specific query requests by checking the metadata descriptions of those data sources. Information source-specific query requests are query requests that are configured to access the particular information sources that store data desired by the user.

The information sources and data fields that are required to be accessed in order to obtain the requested information are determined by the linkings of the logical metadata elements to the physical metadata elements in the MetaBase metadata repository. For example, referring to FIG. 4, a global query object which comprises a query request for "custss" is converted into information source-specific query requests for "customer" in information source 130a and "custid" in information source 130b.

At step 712, the information source-specific query requests are employed by MetaMatrix server 100 to retrieve data from the disparate information sources.

Specifically, data access service module 108 of MetaMatrix server 100 accesses each of the disparate information sources to retrieve the desired information. At step 714, the system generates a set of information source-specific results. In other words, the system generates a set of results from each of the disparate information sources that were accessed by MetaMatrix server 100 at step 712.

At step 716, the metadata management system converts the set of information source-specific results into a global result object. Specifically, the system aggregates the various sets of information source-specific results that were generated from each of the disparate information sources at step 714. At step 718, MetaMatrix server 100 delivers the global result object to the user that initiated the query.

As mentioned in connection with FIG. 2, query service module 102 is coupled to and communicates with client application programming interface 120 for receiving the query requests generated by the client, and for transmitting a response to the query request once the query request has been processed by MetaMatrix server 100. In order to facilitate the processing of a query request, query service module 102, according to one embodiment of the invention, generates and executes a query plan. A query plan is an executable set of operations which optimizes the processing of a query request.

In a preferred embodiment of the invention, query service module 102 is configured to generate a query plan which asynchronously processes the steps involved in the execution of a query request. An asynchronous operation is typically characterized by the simultaneous performance of several processes. In the present invention, and as will be explained in further detail below, query service module 102 operates asynchronously by performing a first query operation, then performing a second query operation prior to receiving the results of the first query operation.

FIG. 9 is a diagram that illustrates a query plan as a configuration of nodes.

Each node of the query plan relates to a specific query request function or operation. The last node of each branch of the query plan, namely nodes 901,904,905 and 907, corresponds to an operation which directly accesses data from an information source.

The intermediate nodes connecting these end nodes correspond to other processing steps in the handling of the query requests. For instance, node 903 or 906 may correspond to an operation whereby a global query object is converted into an information sourcespecific query, such as is explained in connection with step 706 of the flowchart in FIG. 7, or may correspond to operations such as joining or sorting the query results, pivotably transforming the query results (as is explained below) or any other type of operation.

Thus, in a preferred embodiment, once a query plan has been generated, the lowest nodes of the plan are processed first and the results of the query operation performed at these lowest nodes are transmitted to the next highest nodes of the plan.

These next highest nodes in turn process the information they have received and transmit the results of their query operation to the next highest nodes of the plan, and so on.

Generally, in order to operate asynchronously, query service module 102 maintains each of the nodes in one of several operational states, and keeps track of each node's operational state as the query plan is executed. For instance, a first node may be maintained in a "ready" state, in which the node is ready to process a query request and to transmit the query results to a second node. In order to receive the query results transmitted by the first node, the second node is preferably maintained in an "awaiting" state, so as to be sure that the second node is not simultaneously processing a query request when the first node is prepared to transmit its results thereto.

Once the first node is in the "ready" state and the second node is in the "awaiting" state, the system may modify the operation state of the first node to a "process" state. In the "process" state, the node processes the query in order to transmit the results to the second node. Once the first node has processed the query and has transmitted the results to the second node, the first node has completed its operation, and may be maintained in a "finished" state.

Figure 10:
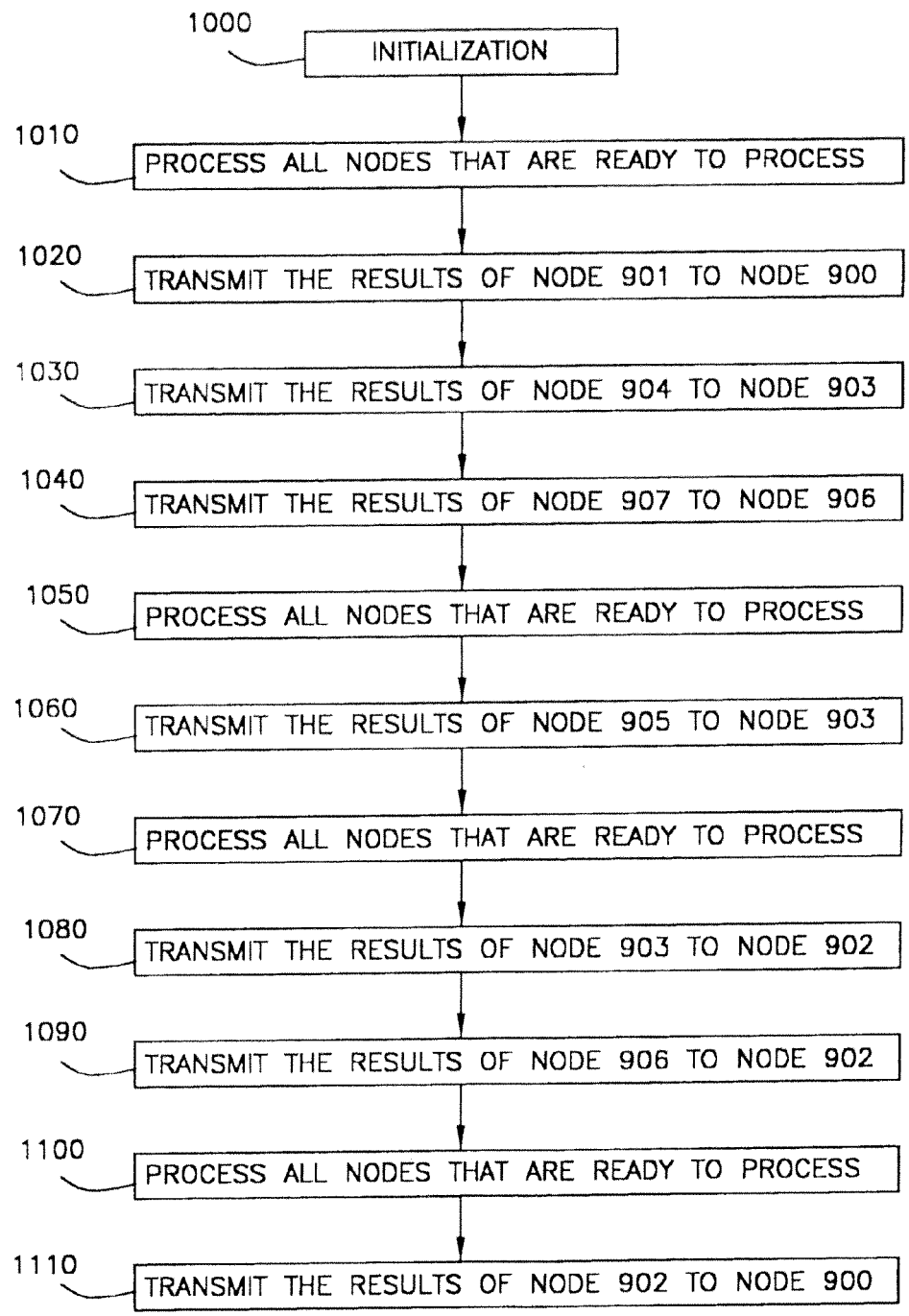
FIG. 10 is a flowchart that illustrates the steps that are performed by a query service module in order to execute a query request plan, in accordance with one embodiment of the present invention.

FIG. 10 is a flowchart that illustrates an example of the steps that may be performed by query service module 102 in order to execute a query plan. For the purposes of illustration only, FIG. 10 shows the steps that are performed in order to execute the query plan shown in FIG. 9. At step 1000, the system is initialized.

According to one embodiment, the initialization step involves the system discerning the operational states that each node is in. In this query plan, the nodes at the end of the branches, namely nodes 901,904,905 and 907, are maintained in a "ready" state at this step since, as explained previously, the lowest nodes are processed first. Likewise, nodes of the query plan which are connected above these lowest nodes, namely nodes 900,902, 903 and 906, are maintained in an "awaiting" state.

At step 1010, query service module 102 determines which nodes are ready to be processed and proceeds to process all nodes that are ready to be processed. Specifically, since nodes 901,904,905 and 907 are all ready to process at the previous step, these nodes are therefore processed at this step. Thus, each of these nodes processes its respective query operation, such as to access an information source with an information source-specific query.

At step 1020, query service module 102 transmits the query results of node 901 to node 900. As previously discussed, the query results of node 901 can be transmitted to node 900 because the system is cognizant that node 900 is in an "awaiting" state of operation. Once the query results of node 901 have been transmitted to node 900, node 901 is maintained in a "finished" state.

At step 1030, query service module 102 transmits the query results of node 904 to node 903. The query results of node 904 can be transmitted to node 903 because the system is cognizant that node 903 is in an "awaiting" state of operation. Once the query results of node 904 have been transmitted to node 903, node 904 is maintained in a "finished" state.

At step 1040, query service module 102 transmits the query results of node 907 to node 906. The query results of node 907 can be transmitted to node 906 because the system is cognizant that node 906 is in an "awaiting" state of operation. Once the query results of node 907 have been transmitted to node 906, node 907 is maintained in a "finished" state.

At step 1050, query service module 102 again determines which nodes are ready to be processed and proceeds to process all such nodes. In this example, the system determines that node 906 is ready to process, because node 906 is in a "ready" state, and the node located directly above it, namely node 902, is in an "awaiting" state. Thus, node 906 processes its respective query operation, such as to convert an information sourcespecific query result into a global result object, or to perform any other type of operation.

At step 1060, query service module 102 transmits the query results of node 905 to node 903. The query results of node 904 can be transmitted to node 903 because the system is again cognizant that node 903 is in an "awaiting" state of operation. Once the query results of node 905 have been transmitted to node 903, node 905 is maintained in a "finished" state.

At step 1070, query service module 102 again determines which nodes are ready to be processed and proceeds to process all such nodes. In this example, the system determines that node 903 is ready to process, because node 903 is in a "ready" state, and the node located directly above it, namely node 902, is in an "awaiting" state. Thus, node 903 processes its respective query operation, such as to convert an information sourcespecific query result into a global result object.

At step 1080, query service module 102 transmits the query results of node 903 to node 902. The query results of node 903 can be transmitted to node 902 because the system is cognizant that node 902 is in an "awaiting" state of operation. Once the query results of node 903 have been transmitted to node 902, node 903 is maintained in a "finished" state.

At step 1090, query service module 102 transmits the query results of node 906 to node 902. The query results of node 906 can be transmitted to node 902 because the system is cognizant that node 902 is in an "awaiting" state of operation. Once the query results of node 906 have been transmitted to node 902, node 906 is maintained in a "finished" state.

At step 1100, query service module 102 again determines which nodes are ready to be processed and processes these nodes. In this example, the system determines that node 902 is ready to process, because node 902 is in a "ready" state, and the node located directly above it, namely node 900, is in an "awaiting" state. Thus, node 902 processes its respective query operation.

At step 1110, query service module 102 transmits the query results of node 902 to node 900. The query results of node 902 can be transmitted to node 900 because the system is cognizant that node 900 is in an "awaiting" state of operation. Once the query results of node 902 have been transmitted to node 900, node 902 is maintained in a "finished" state. Furthermore, since this step comprises the completion of the query plan (e.g.—the query plan is fully executed), once the query results have been received by node 900, node 900 is also maintained in a "finished" state.

Thus, the present invention is configured to generate and execute a query plan in order to efficiently process a query request from a user. By generating a query plan that can be executed in an asynchronous manner, the present invention thereby optimizes the processing of the various query operations.

One of the advantages of generating and executing a query plan as just described is that, by separating a query request into several atomic query operations, each separate atomic query operation can be performed in the most advantageous location. For instance, one of the query operations that might be performed at a particular node is the joining of various query results. Similarly, another of the query operations that might be performed at a particular node is the sorting of various query results. The efficiency of the system is improved if these joining or sorting steps can be performed in an information source, instead of in the MetaMatrix server 100. If a particular information source has the capability of performing the joining or sorting operations (the metamodeler maintains data regarding the capabilities of the various information sources connected to the MetaMatrix server 100), the query plan may provide that these functions be performed in the information sources, rather than by MetaMatrix server 100. According to one embodiment of the present invention, the metadata management system may also be configured to simultaneously process the query requests of several different users. For instance, query service module 102 may aggregate the query requests of several different users into a single query plan. In this manner, certain operations which would ordinarily be required to be performed in separate query plans for each user request, may instead be performed a single time, thereby increasing the efficiency of the system and eliminating redundant operations.

For instance, two separate users may request, for different purposes, the same data from the same information source. Because the data will be employed for different purposes by the two users, a separate query plan for each user will comprise a different set of query operations. However, at least one operation, namely the retrieval of the similar data from the information source, will be the same. Thus, query service module 102 may consolidate that operation of the two separate query plans so as to only retrieve the data once. Once retrieved, the differing query operations may be subsequently performed and the data employed by the respective users for their desired purposes.

Figure 11:
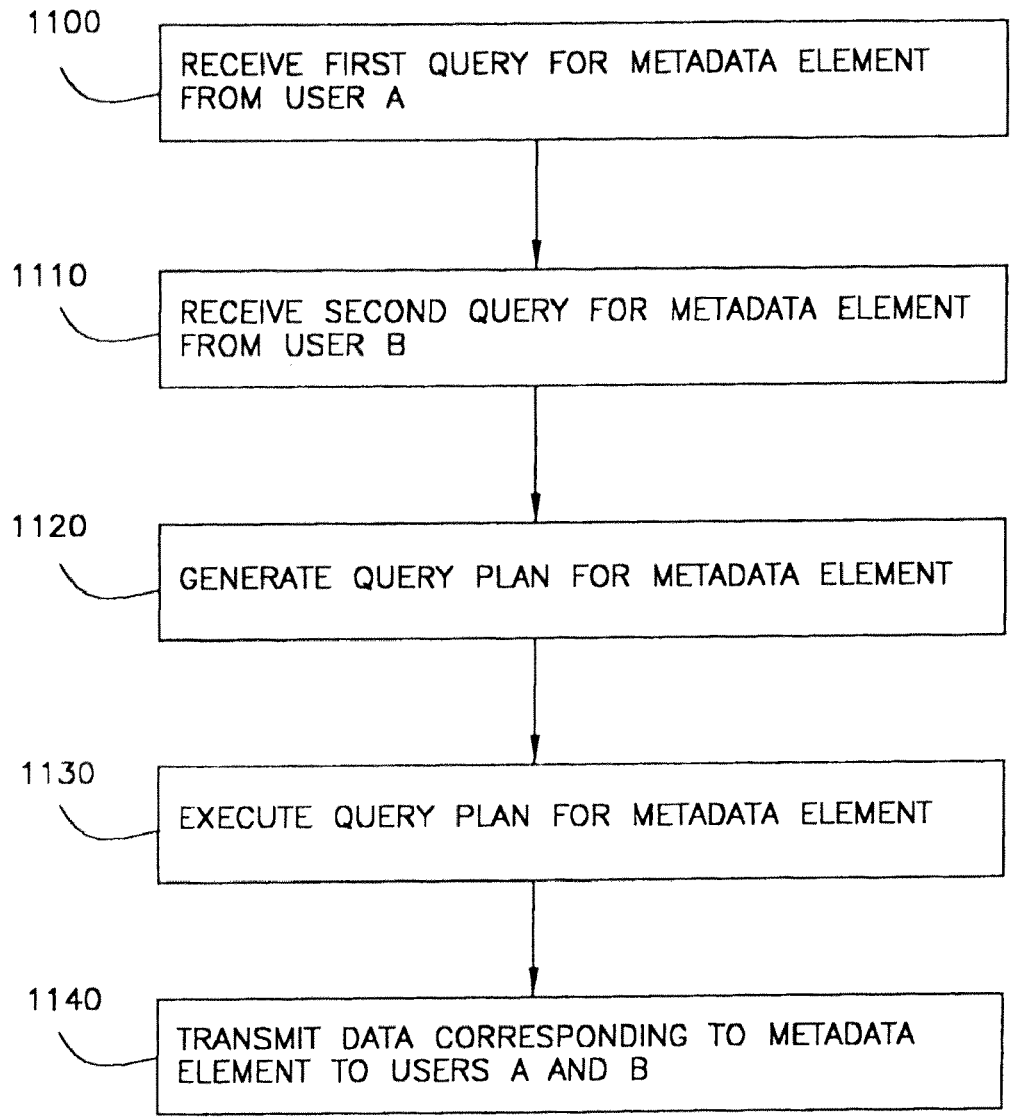
FIG. 11 is a flowchart which illustrates the steps which are performed by the metadata management system in order to optimize the handling of identical query requests from different users, in accordance with one embodiment of the present invention.

The present invention, according to one embodiment thereof, may also employ a particular query plan in order to provide the same data from the same information sources to different users, wherein the different users have made the same query request. Again, the system seeks to optimize its performance by eliminating redundant operations. For instance, FIG. 11 is a flowchart which illustrates the steps which are performed by the system in order to optimize the handling of identical query requests from different users.

At step 1100, MetaMatrix server 100 receives a first query request for a particular metadata element from a first user. At step 1110, MMS receives a second query request for the same metadata element from a second user. Rather than generating a separate query plan for each query request, query service module 102 may instead, at step 1120 of the flowchart, generate a single query plan to retrieve data corresponding to the request metadata element.

At step 1130, the metadata management system executes the query plan generated in step 1120. Finally, at step 1140, the metadata management system transmits the data corresponding to the metadata element to both the first and the second users. According to one embodiment of the invention, the data is transmitted to both users in a point-topoint fashion. In this manner, multiple requests for the same data may be handled simultaneously, greatly improving the efficiency of the system.

As previously discussed, the query plans that are generated and executed by query service module 102 may comprise a variety of individual operations. One such operation is to join, or unify, groups of data from disparate information sources. An example of this is shown in FIGS. 12 and 13.

FIG. 12 illustrate two separate data tables 130*a* and 130*b*. Data table 130*a* comprises a table of data corresponding to Ford cars. Specifically, the data table shows data field 131*a*, which identifies the "make" of the automobiles to which the data pertains as "Ford". Similarly, the data table shows data field 132*a*, which identifies the "type" of automobiles to which the data pertains as "cars". Within the table, three columns of data are identified as data fields 133*a*, which stores data relating to the "record number", data field 134*a* which stores data relating to "color", and data field 135*a*, which stores data relating to "model."

Similarly, data table 130*b* comprises a table of data corresponding to Chevy trucks. Specifically, the data table shows data field 131*b*, which identifies the "make" of the automobiles to which the data pertains as "Chevy". Similarly, the data table shows data field 132*b*, which identifies the "type" of automobiles to which the data pertains as "trucks". Within the table, three columns of data are identified as data fields 133*b*, which stores data relating to the "record number", data field 134*b* which stores data relating to "color", and data field 135*b*, which stores data relating to "model."

According to one embodiment, the metadata management system of the present invention allows the creation of single "logical" data group comprised of aggregation elements that present the data from the different information sources as a single aggregated data group. For instance, in the example explained above in connection with FIG. 12, the present invention may be employed to combine the data of data tables 130*a* and 130*b* into a single data table accessible to a user. FIG. 13 illustrates a data table which joins, or unifies, the data of data tables 130*a* and 130*b*. Specifically, the metadata management system of the present invention employs the metadata elements of the two disparate information sources in order to provide a data table which stores the information in a single table, with additional columns of data corresponding to the original data table names.

For instance, joined data table 130*c* comprises data field names 133*c*, 134*c* and 135*c*, which correspond to the data field names of the original two data tables. Thus, data field 133*c* in data table 130*c* stores data relating to a record number, similar to data fields 133*a* and 133*b* in data tables 130*a* and 130*b*, respectively. Likewise, data field 134*c* in data table 130*c* stores data relating to the color of an automobile, similar to data fields 134*a* and 134*b* in data tables 130*a* and 130*b*, respectively. Finally, data field 135*c* in data table 130*c* stores data relating to the model of an automobile, similar to data field 135*a* and 135*b* in data tables 130*a* and 130*b*, respectively.

Data table 130*c* also comprises two additional columns of data, identified herein as data fields 131*c* and 132*c*. Data field 131*c* corresponds to data fields 131*a* and 131*b* in data tables 130*a* and 130*b*, respectively. Similarly, data field 132*c* corresponds to data fields 132*a* and 132*b* in data tables 130*a* and 130*b*, respectively. However, the metadata management system of the present invention has converted the data table names of the original data tables into columns of data. Thus, in data table 130*c*, data field name 131*c* is referred to as "Make" and identifies the make of the automobiles for each data record.

The data stored in the data column identified as data field name 131*c* may be either "Ford" or "Chevy", depending in which of the original data tables the record originated.

Similarly, data field name 132*c* is referred to as "Type" and identifies the type of the automobile for each data record. The data stored in the data column identified as data field name 132*c* may be either "Car" or "Truck", depending in which of the original data tables the record originated.

Another operation which may be performed during the execution of a query plan by query service module 102 is referred to as a dimensional transform. Dimensional transforms (which are also referred to as pivots) alter the format in which data is stored.

For instance, according to one embodiment of the invention, a dimensional transform of data may allow for elements stored in rows in a first data format to be transformed and stored in columns in a second data format. An example of this is shown in FIGS. 14 and 15.

FIG. 14 illustrates data table 140*a*. Data table 140*a* comprises a table of data corresponding to quarterly sales figures. Specifically, the data table shows data field 141*a*, which identifies a "record number" (in this example, each record may pertain to a calendar or fiscal year). In addition, the data table shows data fields 142*a*, 143*a*, 144*a* and 145*a*, which are labeled as "SQ1", "SQ2", "SQ3" and "SQ4", respectively. Each of these data field names corresponds to a column of data in which is stored the sales figures for the respective quarter of the record (e.g.—year). Of course, this is just one of many different formats that may be employed to store quarterly sales figures.

For any number of reasons, a user of the system may desire that the quarterly sales data be stored in a format which is different than the format illustrated in FIG. 14.

One such reason may be that, in order to obtain the quarterly sales data from the data format discussed above, it is necessary to make a query request using four different query terms, namely, "SQ1", "SQ2", "SQ3" and "SQ4". In order to simplify the use of the system, it would be advantageous if a user was able to make a query request using a single query term in order to obtain the same quarterly sales data. The employment of a dimensional transform operation, according to one embodiment of the present invention, allows this to occur.

For instance, FIG. 15 illustrates data table 140*b*. Data table 140*b* also comprises a table of data corresponding to quarterly sales figures. However, in this case, the metadata management system has pivoted the data so as to be arranged in a format which helps to simplifies the query request process. Specifically, the data table shows data field 141*b*, which identifies a "record number". In addition, the data table shows data field 146*a*, which is labeled as "Sales" and which corresponds to a column of data in which is stored the sales figures. Furthermore, the data table shows data field 147*a*, which is labeled as "Quarter" and which corresponds to a column of data in which is stored the quarter for which each of the sales figures pertains.

As mentioned above, the re-formatting of data from the format shown in FIG. 14 to the format shown in FIG. 15 provides the advantage of eliminating the necessity of making a query request using four different query terms, namely, "SQ1", "SQ2", "SQ3" and "SQ4" in order to obtain the same quarterly sales figures. Specifically, with the data re-formatted as illustrated in FIG. 15, a user can make a query request using a single query term in order to obtain quarterly sales data. In this case, a user can obtain quarterly sales data by making a query request using the single query term "Sales".

According to one embodiment, the present invention may also be employed to write data, provided by a user, back into the storage spaces of disparate information sources in order to update the information sources. Advantageously, the metadata management system of the present invention employs the two metadata layers of the MetaBase metadata repository to determine which data fields of the disparate information sources are to be updated. However, instead of retrieving data from the disparate information sources as has been described previously, data is transmitted to the information sources for storage therein. The employment of the multiple metadata layers in the metadata repository enables this to be performed, even in the event that the relevant information sources maintain the data in fields having different data field names, that the information sources employ incompatible data formats, and that the relevant information sources employ different information system languages.

Figure 16:
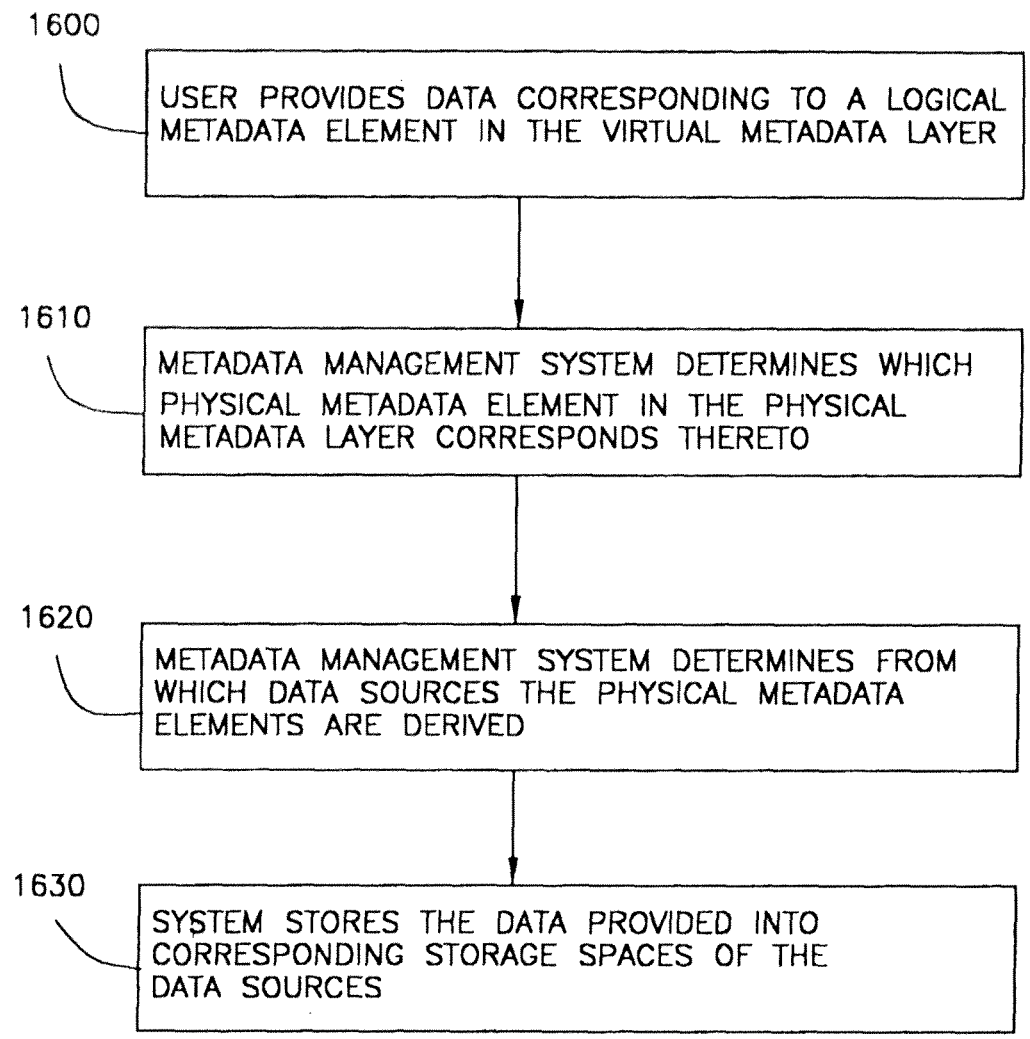
FIG. 16 is a flowchart that illustrates the steps that are performed in order to transmit, or write back, data provided by a user into the information sources, in accordance with one embodiment of the present invention.
Figure 17:
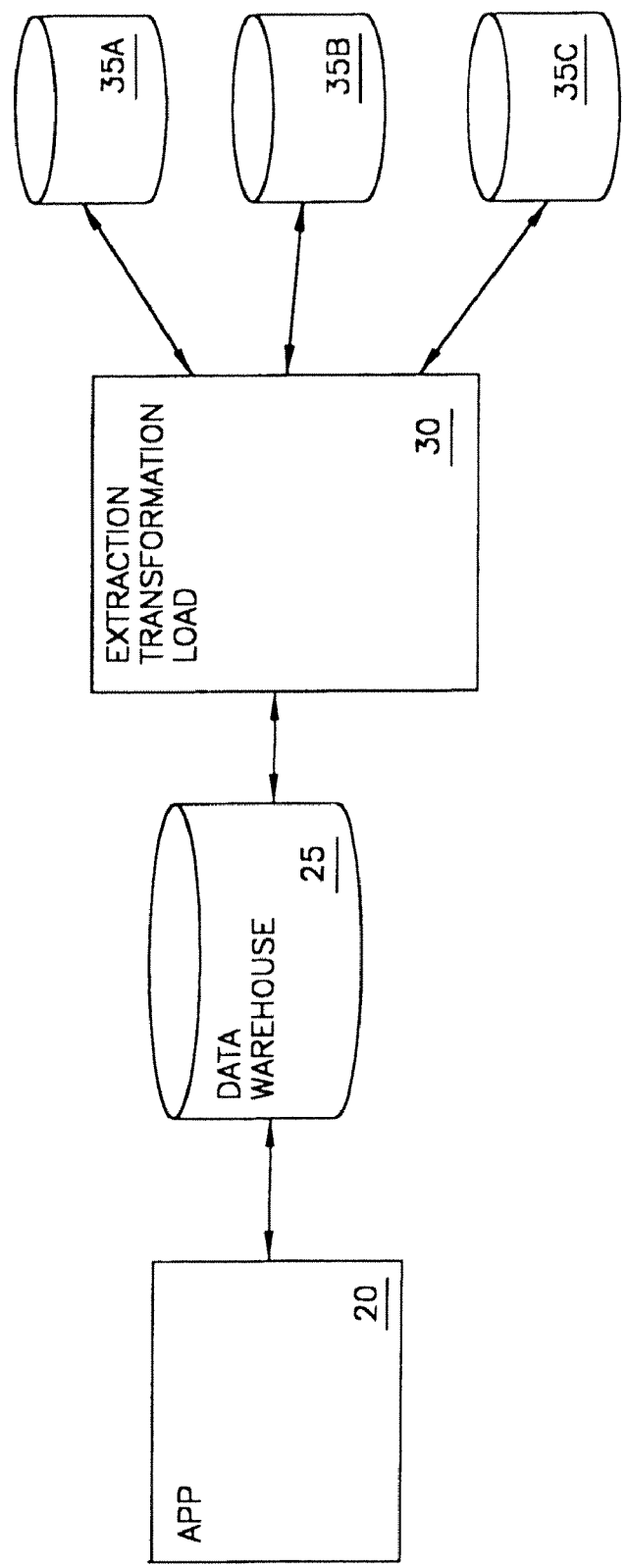
FIG. 17 is a block diagram that illustrates the main components of a system that employs data warehousing, in accordance with the prior art.
Figure 18:
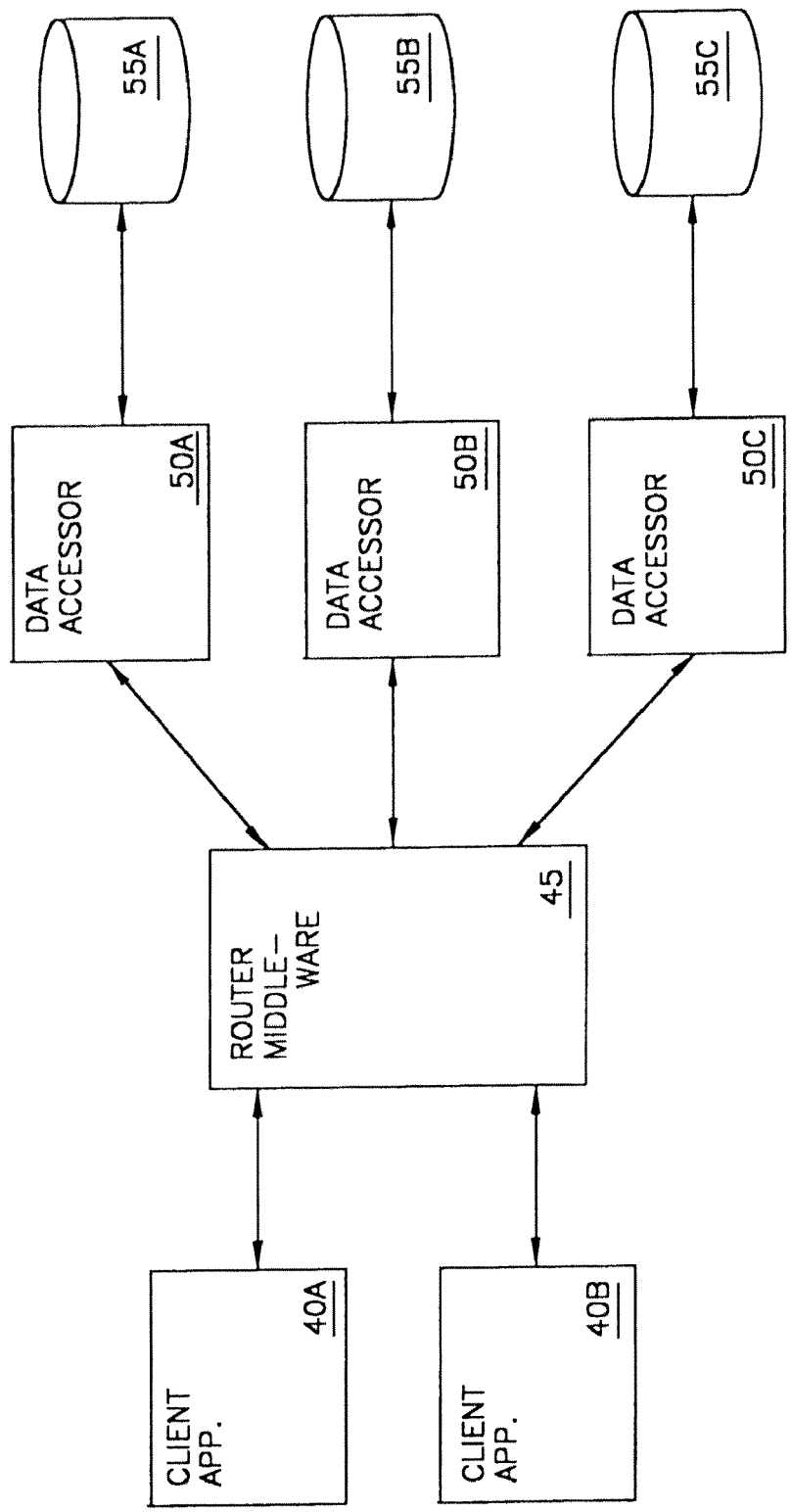
FIG. 18 is a block diagram that illustrates the main components of a system that employs data silos, in accordance with the prior art.

FIG. 16 is a flowchart that illustrates the steps that are performed, according to one embodiment of the present invention, in order to transmit, or write back, data provided by a user to the disparate information sources. At step 1600, a user provides data corresponding to a logical metadata element in virtual metadata layer 114. Thus, using the system shown in FIG. 4 as an example, a user may provide data corresponding to the logical metadata element 114*a*, identified as "custss", in virtual metadata layer 114.

At step 1610, the metadata management system determines which physical metadata elements of physical metadata layer 116 are linked to the logical metadata element discussed in step 1600. In the system shown in FIG. 4, the metadata management system will determine that the physical metadata elements of physical metadata layer 116 which are linked to logical metadata element 114a are physical metadata elements 116a and 116e. These physical metadata elements are identified as "customer" and "custid", respectively.

At step 1620, the metadata management system determines from which of the disparate information sources these physical metadata elements are derived. In the system shown in FIG. 4, the metadata management system will determine that physical metadata elements 116a, identified as "customer", is derived from information source 130a. Similarly, the metadata management system will determine that physical metadata elements 116e, identified as "custid", is derived from information source 130b. In other words, and as explained previously, the physical metadata elements "customer" and "custid" refer to data storage spaces in information sources 130a and 130b, respectively.

Finally, at step 1630, the metadata management system stores the data provided by the user in the storage spaces of the information sources. Thus, even though the user provided the client application programming interface with an instruction to write data to an element named "custss", the system of the present invention permits the data to be written to storage spaces in disparate information sources having different field names.

Thus, while there have been shown and described and pointed out fundamental novel features of the invention as applied to alternative embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto. It is to be understood that the drawings are not necessarily drawn to scale, but that they are merely conceptual in nature.

What is claimed is:

1. A system for accessing data in an information source, the system comprising:
   a metadata repository configured to store a first type of the metadata element that includes physical metadata elements defining a one-to-one relationship data stored in a plurality of information sources, and a second type of metadata element that includes logical metadata elements that are linked to one or more of the physical metadata elements in a one-to-many relationship; and
   a server communicably coupled to the metadata repository, wherein the server is operable to:
      convert a query request for one or more of the logical metadata elements to a source-specific query request corresponding to at least one of the information sources by referencing the two types of metadata elements; and
      generate a query plan to retrieve data from the information sources referenced by the source-specific query request, wherein at least one of a join operation and a sort operation of the query plan are performed by one or more of the information sources if they have a capability to perform the operation as determined based on data maintained by the server regarding capabilities of the information sources.

2. The system according to claim 1, wherein one or more of the logical metadata elements transforms, using the microprocessor, the data retrieved at the logical metadata element into different data by manipulating the data with a predefined operation.

3. The system according to claim 1, wherein the second type of the metadata elements includes a select logical metadata element that is linked to a select logical rule element that selects, via a defined selection criteria, one of the physical metadata elements linked to the select logical metadata element.

4. The system according to claim 1, wherein the query plan for retrieving the data from the one or more information sources optimizes the processing of the query request.

5. The system according to claim 4, wherein the query plan includes the server to join data from a first and a second information source to form a single new information source.

6. The system according to claim 5, wherein the query plan includes the server to generate the new information source as a data table with a plurality of data columns, the plurality of data columns comprising data columns in the first and second information sources, and further comprising data columns corresponding to data table name of the first and second information sources.

7. The system according to claim 1, wherein the query plan includes the server to pivot data in first information source storing data in a first format to form a second information source storing the data in a second format.

8. The system according to claim 7, wherein a query request for data in the first data format requires multiple query terms, while the query request for data in the second data format requires a single query term.

9. A method for accessing data in an information source, the method comprising:
   receiving, at a server machine communicably coupled to a metadata repository and to a plurality of information sources, a query request for one or more logical metadata elements, wherein the plurality of information sources include different types of data each defined in a one-to-one relationship by physical metadata elements, and wherein the metadata repository stores both of the physical metadata elements and the logical metadata elements that are linked to one or more of the physical metadata elements in a one-to-many relationship;
   converting, by the server machine, the query request to a source-specific query request corresponding to at least one of the information sources by referencing the two types of metadata elements; and
   generating, by the server machine, a query plan for retrieving data from the information sources referenced by the source-specific query request, wherein at least one of a join operation and a sort operation of the query plan are performed by one or more of the information sources if they have a capability to perform the operation as determined based on data maintained by the server machine regarding capabilities of the information sources.

10. The method according to claim 9, wherein one or more of the logical metadata elements transforms, using the microprocessor, the data retrieved at the logical metadata element into different data by manipulating the data with a predefined operation.

11. The method according to claim 9, wherein the logical metadata elements include a select logical metadata element that is linked to a select logical rule element that selects, via a defined selection criteria, one of the physical metadata elements linked to the select logical metadata element.

12. The method according to claim 9, wherein the query plan for retrieving the data from the one or more information sources optimizes the processing of the query request.

13. The method according to claim 12, wherein the query plan comprises a plurality of operations to be performed by the server.

14. The method according to claim 13, wherein one of the plurality of operations to be performed by the server comprises joining data from a first and a second information source to form a single new information source.

15. The method according to claim 14, wherein joining data from a first and a second information source further comprises generating the new information source as a data table with a plurality of data columns, the plurality of data columns comprising data columns in the first and second information sources, and further comprising data columns corresponding to data table name of the first and second information sources.

16. The method according to claim 14, wherein one of the plurality of operations to be performed by the server comprises pivoting data in first information source storing data in a first format to form a second information source storing the data in a second format.

17. The method according to claim 16, wherein a query request for data in the first data format requires multiple query terms, while the query request for data in the second data format requires a single query term.

* * * * *